US012648032B2

(12) United States Patent
Deng

(10) Patent No.: US 12,648,032 B2
(45) Date of Patent: Jun. 2, 2026

(54) METHOD FOR COMMUNICATION BETWEEN USER TERMINAL AND NETWORK, AND TERMINAL, NETWORK DEVICE AND APPARATUS

(71) Applicant: DATANG MOBILE COMMUNICATIONS EQUIPMENT CO., LTD., Beijing (CN)

(72) Inventor: Qiang Deng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 640 days.

(21) Appl. No.: 18/013,247

(22) PCT Filed: May 19, 2021

(86) PCT No.: PCT/CN2021/094696
§ 371 (c)(1),
(2) Date: Dec. 28, 2022

(87) PCT Pub. No.: WO2022/028041
PCT Pub. Date: Feb. 10, 2022

(65) Prior Publication Data
US 2023/0262793 A1 Aug. 17, 2023

(30) Foreign Application Priority Data
Aug. 5, 2020 (CN) .......................... 202010777659.3

(51) Int. Cl.
H04W 76/14 (2018.01)
H04W 28/02 (2009.01)
H04W 92/18 (2009.01)

(52) U.S. Cl.
CPC ....... *H04W 76/14* (2018.02); *H04W 28/0268* (2013.01); *H04W 92/18* (2013.01)

(58) Field of Classification Search
CPC ............... H04W 4/70; H04W 28/0236; H04W 28/0268; H04W 28/06; H04W 40/12;
(Continued)

(56) References Cited

U.S. PATENT DOCUMENTS

| | | | |
|---|---|---|---|
| 2013/0028127 A1 | 1/2013 | Zheng et al. | |
| 2018/0279319 A1 | 9/2018 | Yu et al. | |
| 2021/0289391 A1* | 9/2021 | Paladugu | H04W 88/04 |

FOREIGN PATENT DOCUMENTS

| | | | |
|---|---|---|---|
| CN | 110786062 A | 2/2020 | |
| CN | 110891314 A | 3/2020 | |
| WO | WO-2021067130 A1 * | 4/2021 | H04L 47/183 |

OTHER PUBLICATIONS

OPPO,"KI#3, New SoI: QoS handling for Layer-3 UE-to-Network Relay", 3GPP SA WG2 Meeting #139E, Jun. 1-12, 2020, Elbonia, total 4 pages, S2-2003945(Revision of S2-200xxxx).
(Continued)

*Primary Examiner* — Thomas R Cairns

(74) *Attorney, Agent, or Firm* — Kilpatrick Townsend & Stockton LLP

(57) ABSTRACT

Disclosed in the present invention are a method for communication between a user terminal and a network, and a terminal, a network device and an apparatus, wherein same are used to more accurately provide end-to-end quality of service for a remote UE, such that the remote UE achieves the aim of communicating with the network. The method comprises: a relay user terminal UE determining a communication delay PC5 PDB of a PC5 interface and a communication delay Uu PDB of a Uu interface; the relay UE sending the PC5 PDB to a remote user terminal UE, such that the remote UE communicates with the relay UE according to the PC5 PDB; and the relay UE communicating with
(Continued)

a core network according to the Uu PDB sent by a session management function (SMF).

12 Claims, 11 Drawing Sheets

(58) Field of Classification Search
CPC ..... H04W 40/22; H04W 76/14; H04W 88/04; H04W 92/18; H04W 4/40–48; H04W 72/25; H04W 72/40; H04W 72/54–543; H04W 92/10; H04W 8/005; H04W 28/24; H04W 84/18; H04L 47/365
See application file for complete search history.

(56) References Cited

OTHER PUBLICATIONS

OPPO,"KI#3, New SoI: QoS handling for Layer-3 UE-to-Network Relay", 3GPP SA WG2 Meeting #139E, Jun. 1-12, 2020, Elbonia, total 4 pages, S2-2004729(Revision of S2-2003945r01).
Huawei et al., "KI#3, SoI#24: Update on the configured QoS mapping", 3GPP TSG-WG SA2 Meeting #141E e-meeting, Elbonia, Oct. 12-23, 2020, total 4 pages, S2-2007215(revision of S2-200xxxx).
Qualcomm Incorporated, "KI#3, New solution to support end-to-end QoS for Layer-3 UE-to-Network Relay", SA WG2 Meeting #139E (e-meeting), Elbonia, Jun. 1-12, 2020, total 5 pages, S2-2004289.
Koziol Dawid et al: "QoS and service continuity in 3GPP D2D for IoT and wearables", 2017 IEEE Conference on Standards for Communications and Networking (CSCN), IEEE, Sep. 18, 2017, total 7 pages.

* cited by examiner

1500

An SMF determines Uu PDB to be sent to a relay UE according to a received communication delay Uu PDB of a Uu interface

1501

The SMF sends the determined Uu PDB to be sent to the relay UE to the relay UE

METHOD FOR COMMUNICATION BETWEEN USER TERMINAL AND NETWORK, AND TERMINAL, NETWORK DEVICE AND APPARATUS

CROSS-REFERENCE OF RELATED APPLICATIONS

The present application is a US National Stage of International Application No. PCT/CN2021/094696, filed on May 19, 2021, which claims the priority from Chinese Patent Application No. 202010777659.3, filed with the China National Intellectual Property Administration (CNIPA) on Aug. 5, 2020 and entitled "Method for Communication between User Terminal and Network, Terminal, Network Device and Apparatus", the entire contents of which are hereby incorporated by reference.

FIELD

The disclosure relates to the field of wireless communication technologies, and in particular, to a method for communication between a user terminal and a network, a terminal, a network device and an apparatus.

BACKGROUND

In the 3GPP (Third Generation Partnership Project) R17 (Release 17), research and standardization have been carried out on the ProSe (Proximity Services) in the 5G system. An important scenario in the ProSe is: a Remote UE (remote user terminal) communicates with the network through a Relay UE (relay user terminal) to obtain related services. The 5G core network determines the QoS (Quality of Service) of the Relay UE only according to service characteristics. However, how to manage the QoS of the Relay UE to provide the end-to-end (Remote UE and Remote UE UPF) QoS for the Remote UE and the Remote UE can achieve the purpose of communicating with the network is still an unsolved problem in the 5G system standard.

BRIEF SUMMARY

The disclosure provides a method for communication between a user terminal and a network, a terminal, a network device and an apparatus, to determine, through the relay UE, the communication delay between the remote UE and the relay UE and determine the communication delay between the relay UE and the network device, and the relay UE can provide the end-to-end quality of service for the remote UE more accurately, and thus the remote UE can achieve the purpose of communicating with the network.

In some embodiments of the disclosure provide a method for communication between a user terminal and a network, including:

determining, by a relay User Equipment (UE), a packet delay budget (PDB) of a PC5 interface (PC5 PDB) and a PDB of a Uu interface (Uu PDB);

sending, by the relay UE, the PC5 PDB to a remote UE and the remote UE communicates with the relay UE according to the PC5 PDB;

communicating, by the relay UE, with a core network according to a Uu PDB sent by a Session Management Function (SMF).

In the method provided by the embodiments of the disclosure, the communication delay of the PC5 interface and the communication delay of the Uu interface are determined by the relay UE, rather than determined by the network device according to the service requirements, so the network can provide the relay UE with the more accurate quality of service to an extent, and the relay UE can also provide the remote user with the more accurate quality of service.

In some embodiments, the determining, by the relay UE, the PC5 PDB and the Uu PDB, includes:

determining, by the relay UE, the PC5 PDB and the Uu PDB according to resource configuration information of the PC5 interface and the Uu interface; or determining, by the relay UE, the PC5 PDB and the Uu PDB according to policy information sent by a Policy Control Function (PCF); or receiving, by the relay UE, the Uu PDB sent by the SMF, and determining the PC5 PDB according to the Uu PDB.

In the method provided in the embodiments, the relay UE can determine the communication delay of the PC5 interface and the communication delay of the Uu interface through different means, and each means can determine the communication delays of the two interfaces more accurately than the prior art. If the communication delays are determined according to the resource configuration information, the communication delays of the PC5 interface and the Uu interface can be accurately allocated according to the sizes of the resources configured for the PC5 interface and the Uu interface. If the communication delays are determined according to the policy information, the policy information in the embodiments, compared with the service requirement, considers factors including but not limited to service requirement, interface configuration resource, subscription information and operator policy, so the communication delays of the interfaces can still be accurately determined. If the communication delay of the PC5 interface is determined according to the Uu PDB sent by the SMF, the Uu PDB sent by the SMF is accurate, so the PC5 PDB determined based on the Uu PDB is also accurate.

In some embodiments, the method further includes:

if the relay UE determines the PC5 PDB and the Uu PDB according to the resource configuration information of the PC5 interface and the Uu interface, or if the relay UE determines the PC5 PDB and the Uu PDB according to the policy information sent by the PCF:

sending, by the relay UE, the Uu PDB to the SMF, and the SMF determines, based on the Uu PDB, the Uu PDB to be sent to the relay UE according to subscription information and/or an operator policy.

Although the relay UE in the embodiments determines the Uu PDB, the relay UE may not directly use the Uu PDB to communicate with the core network but send the Uu PDB to the SMF, and the SMF determines whether to change the Uu PDB, and the Uu PDB determined by the relay UE in the embodiments can be changed according to the subscription information and/or the operator policy, the Uu PDB received finally by the relay UE is more in line with the current actual requirements, and the relay UE uses the received Uu PDB to communicate with the network.

In some embodiments, the method further includes:

receiving, by the relay UE, a Quality of Service (QoS) parameter of the PC5 interface (PQI) sent by the remote UE, and determining, based on the PQI, a PQI to be sent to the remote UE according to a QoS support capability of the relay UE, and the remote UE uses the received PQI to communicate with the relay UE;

determining, by the relay UE, a 5G QoS identifier (5QI) according to the PQI determined by the relay UE and a mapping relationship between PQI and 5QI of the Uu interface sent by a PCF, and the relay UE uses the 5QI to communicate with the core network.

The relay UE in the embodiments of the disclosure may further send the PQI to the remote UE and determine the 5QI, and the remote UE uses the PQI and the PC5 PDB to communicate with the relay UE, and the relay UE uses the 5QI and the Uu PDB to communicate with the network.

In some embodiments, the determining, by the relay UE, the PC5 PDB and the Uu PDB according to the resource configuration information of the PC5 interface and the Uu interface, includes:

determining, by the relay UE, the PC5 PDB and the Uu PDB according to a size of the resource configuration information of the PC5 interface and the Uu interface; and a communication delay of an interface with a smaller size of resource configuration information is greater than a communication delay of an interface with a larger size of resource configuration information; and a sum of the PC5 PDB and the Uu PDB is a communication delay in 5QI determined by the relay UE.

In the embodiments, the communication delay of the interface can be determined according to the size of the resource configuration information of the interface. The communication delay of the interface with the smaller resource configuration is greater than the communication delay of the interface with the larger resource configuration. The communication delay determined in this configuration manner is more accurate, and the end-to-end quality of service requirement of the remote UE can be met better.

In some embodiments, the determining, by the relay UE, the PC5 PDB and the Uu PDB according to the policy information sent by the PCF, includes:

determining, by the relay UE, the PC5 PDB according to a QoS identifier of the PC5 interface (PQI) sent by the remote UE and a mapping relationship between PQI and PC5 PDB sent by the PCF;

determining, by the relay UE, the Uu PDB by subtracting the PC5 PDB from a communication delay in 5QI;

and the 5QI is determined by the relay UE according to the PQI sent by the remote UE and a mapping relationship between PQI and 5QI sent by the PCF.

In the embodiments, the relay UE determines the PC5 PDB and the 5QI according to the policy information of the PCF (including the mapping relationship between PQI and PC5 PDB), and further determines the Uu PDB. Since the mapping relationship between PQI and PC5 PDB is predetermined, the communication delay is determined according to the relationship between the quality of service parameter and the communication delay, which better meets the quality of service requirement of the remote UE to an extent, and further better meets the quality of service requirement of the relay UE.

In some embodiments, the receiving, by the relay UE, the Uu PDB sent by the SMF, and determining the PC5 PDB according to the Uu PDB, includes:

determining, by the relay UE, the PC5 PDB by subtracting the Uu PDB sent by the SMF from a communication delay in 5QI sent by the SMF;

and the 5QI and the Uu PDB are determined by the PCF according to a PC5 PDB sent by the remote UE and service requirement information, and the PC5 PDB sent by the remote UE is determined by the remote UE according to the resource configuration information of the PC5 interface.

In the embodiments of the disclosure, since the Uu PDB sent by the SMF is determined based on the PC5 PDB provided by the remote UE while the PC5 PDB provided by the remote UE is determined based on the resource configuration information of the PC5 interface, the communication delay from the remote UE to the relay UE can be accurately determined, and it is further explained that the communication delay from the relay UE to the core network can be accurately determined, and the end-to-end requirement of the remote UE can be better met ultimately.

In some embodiments of the disclosure provide a method for communication between a user terminal and a network, including:

receiving, by a remote UE, a packet delay budget (PDB) of a PC5 interface (PC5 PDB) sent by a relay UE, and the PC5 PDB is determined by the relay UE;

communicating, by the remote UE, with the relay UE using the PC5 PDB.

In some embodiments:

the PC5 PDB is determined by the relay UE according to resource configuration information of the PC5 interface; or the PC5 PDB is determined by the relay UE according to policy information sent by a PCF; or the PC5 PDB is determined by the relay UE according to Uu PDB sent by an SMF.

In some embodiments, the communicating, by the remote UE, with the relay UE using the PC5 PDB, includes:

receiving, by the remote UE, a PQI sent by the relay UE;

communicating, by the remote UE, with the relay UE according to the PC5 PDB and the PQI if the PC5 PDB is not carried in the PQI;

communicating, by the remote UE, with the relay UE according to the PQI carrying the PC5 PDB if the PC5 PDB is carried in the PQI.

In some embodiments, the method further includes:

determining, by the remote UE, the PC5 PDB according to resource configuration information of the PC5 interface, and sending the PC5 PDB determined by the remote UE to an Application service Function (AF), and the AF sends the received PC5 PDB to the PCF, and the PCF determines 5QI and Uu PDB according to the received PC5 PDB and service requirement information and sends the 5QI and the Uu PDB to the relay UE through an SMF.

In some embodiments of the disclosure provide a method for communication between a user terminal and a network, including:

determining, by an SMF, a Uu PDB to be sent to a relay UE according to a received Uu PDB;

sending, by the SMF, the determined Uu PDB to be sent to the relay UE to the relay UE.

In some embodiments, the determining, by the SMF, the Uu PDB to be sent to the relay UE according to the received communication delay Uu PDB of the Uu interface, includes:

determining, by the SMF, the Uu PDB to be sent to the relay UE according to subscription information and/or an operator policy based on the received Uu PDB sent by the relay UE; or determining, by the SMF, the Uu PDB to be sent to the relay UE based on the received Uu PDB sent by a PCF; and the Uu PDB sent by the PCF is determined by the PCF according to PC5 PDB sent by a remote UE and service requirement information.

In some embodiments, the sending, by the SMF, the determined Uu PDB to be sent to the relay UE to the relay UE, includes:

determining, by the SMF, a 5QI to be sent to the relay UE according to subscription information and/or an operator policy based on a received QoS parameter 5QI of the Uu interface sent by the relay UE; and sending, by the SMF, the 5QI to be sent to the relay UE to the relay UE; or sending, by the SMF, a received 5QI sent by a PCF to the relay UE; and the 5QI sent by the PCF is determined by the PCF according to a service requirement.

In some embodiments of the disclosure further provide a relay terminal, including a memory, a transceiver and a processor:

the memory is configured to store a computer program; the transceiver is configured to send and receive data under control of the processor; and the processor is configured to read the computer program in the memory and perform following operations:

determining, by a relay UE, a PC5 PDB and a Uu PDB;

sending, by the relay UE, the PC5 PDB to a remote UE and the remote UE communicates with the relay UE according to the PC5 PDB;

communicating, by the relay UE, with a core network according to a Uu PDB sent by an SMF.

In some embodiments, the processor is configured to:

determine, by the relay UE, the PC5 PDB and the Uu PDB according to resource configuration information of the PC5 interface and the Uu interface; or determine, by the relay UE, the PC5 PDB and the Uu PDB according to policy information sent by a PCF; or receive, by the relay UE, the Uu PDB sent by the SMF, and determine the PC5 PDB according to the Uu PDB.

In some embodiments, the processor is further configured to:

if the relay UE determines the PC5 PDB and the Uu PDB according to the resource configuration information of the PC5 interface and the Uu interface, or if the relay UE determines the PC5 PDB and the Uu PDB according to the policy information sent by the PCF:

send, by the relay UE, the Uu PDB to the SMF, and the SMF determines, based on the determined Uu PDB, the Uu PDB to be sent to the relay UE according to subscription information and/or an operator policy.

In some embodiments, the processor is further configured to:

receive, by the relay UE, a PQI sent by the remote UE, and determine, based on the PQI, a PQI to be sent to the remote UE according to a QoS support capability of the relay UE, and the remote UE uses the received PQI to communicate with the relay UE;

determine, by the relay UE, a 5QI according to the PQI determined by the relay UE and a mapping relationship between PQI and QoS parameter 5QI of the Uu interface sent by a PCF, and the relay UE uses the 5QI to communicate with the core network.

In some embodiments, the processor is configured to:

determine, by the relay UE, the PC5 PDB and the Uu PDB according to a size of the resource configuration information of the PC5 interface and the Uu interface;

and a communication delay of an interface with smaller resource configuration is greater than a communication delay of an interface with larger resource configuration; and a sum of the PC5 PDB and the Uu PDB is a communication delay in 5QI determined by the relay UE.

In some embodiments, the processor is configured to:

determine, by the relay UE, the PC5 PDB according to a PQI sent by the remote UE and a mapping relationship between PQI and PC5 PDB sent by the PCF;

determine, by the relay UE, the Uu PDB by subtracting the PC5 PDB from a communication delay in 5QI;

and the 5QI is determined by the relay UE according to the PQI sent by the remote UE and a mapping relationship between PQI and 5QI sent by the PCF.

In some embodiments, the processor is configured to:

determine, by the relay UE, the PC5 PDB by subtracting the Uu PDB sent by the SMF from a communication delay in 5QI sent by the SMF;

and the 5QI and the Uu PDB are determined by the PCF according to a PC5 PDB sent by the remote UE and service requirement information, and the PC5 PDB sent by the remote UE is determined by the remote UE according to the resource configuration information of the PC5 interface.

In some embodiments of the disclosure further provide a remote terminal, including a memory, a transceiver and a processor:

the memory is configured to store a computer program; the transceiver is configured to send and receive data under control of the processor; and the processor is configured to read the computer program in the memory and perform following operations:

receiving, by a remote UE, a PC5 PDB sent by a relay UE, and the PC5 PDB is determined by the relay UE;

communicating, by the remote UE, with the relay UE using the PC5 PDB.

In some embodiments:

the PC5 PDB is determined by the relay UE according to resource configuration information of the PC5 interface; or the PC5 PDB is determined by the relay UE according to policy information sent by a PCF; or the PC5 PDB is determined by the relay UE according to Uu PDB sent by an SMF.

In some embodiments, the processor is configured to:

receive, by the remote UE, a PQI sent by the relay UE;

communicate, by the remote UE, with the relay UE according to the PC5 PDB and the PQI if the PC5 PDB is not carried in the PQI;

communicate, by the remote UE, with the relay UE according to the PQI carrying the PC5 PDB if the PC5 PDB is carried in the PQI.

In some embodiments, the processor is further configured to:

determine, by the remote UE, the PC5 PDB according to resource configuration information of the PC5 interface, and send the PC5 PDB determined by the remote UE to an AF, and the AF sends the received PC5 PDB to the PCF, and the PCF determines 5QI and Uu PDB according to the received PC5 PDB and service requirement information and sends the 5QI and the Uu PDB to the relay UE through an SMF.

In some embodiments of the disclosure further provide a network device, including a memory, a transceiver and a processor:

the memory is configured to store a computer program; the transceiver is configured to send and receive data under control of the processor; and the processor is configured to read the computer program in the memory and perform following operations:

determining, by an SMF, a Uu PDB to be sent to a relay UE according to a received Uu PDB;

sending, by the SMF, the determined Uu PDB to be sent to the relay UE to the relay UE.

In some embodiments, the processor is configured to:
determine, by the SMF, the Uu PDB to be sent to the relay
UE according to subscription information and/or an
operator policy based on the received Uu PDB sent by
the relay UE; or
determine, by the SMF, the Uu PDB to be sent to the relay
UE based on the received Uu PDB sent by a PCF; and
the Uu PDB sent by the PCF is determined by the PCF
according to PC5 PDB sent by a remote UE and service
requirement information.

In some embodiments, the processor is further configured
to:
determine, by the SMF, a 5QI to be sent to the relay UE
according to subscription information and/or an opera-
tor policy based on a received QoS parameter 5QI of
the Uu interface sent by the relay UE; and send, by the
SMF, the 5QI to be sent to the relay UE to the relay UE;
or
send, by the SMF, received 5QI sent by a PCF to the relay
UE; and the 5QI sent by the PCF is determined by the
PCF according to a service requirement.

In some embodiments of the disclosure further provide a
first apparatus for communication between a user terminal
and a network, including: a determining device, a sending
device and a communication device, and:
the determining device is configured to determine a PC5
PDB and a Uu PDB;
the sending device is configured to send the PC5 PDB to
a remote UE and the remote UE communicates with the
relay UE according to the PC5 PDB;
the communication device is configured to communicate
with a core network according to Uu PDB sent by an
SMF.

In some embodiments, the determining device is config-
ured to:
determine, by the relay UE, the PC5 PDB and the Uu PDB
according to resource configuration information of the
PC5 interface and the Uu interface; or
determine, by the relay UE, the PC5 PDB and the Uu PDB
according to policy information sent by a PCF; or
receive, by the relay UE, the Uu PDB sent by the SMF,
and determine the PC5 PDB according to the Uu PDB.

In some embodiments, the apparatus further includes a
first sending device configured to:
if the relay UE determines the PC5 PDB and the Uu PDB
according to the resource configuration information of
the PC5 interface and the Uu interface, or
if the relay UE determines the PC5 PDB and the Uu PDB
according to the policy information sent by the PCF;
send, by the relay UE, the determined Uu PDB to the
SMF, and the SMF determines, based on the received
Uu PDB, the Uu PDB to be sent to the relay UE
according to subscription information and/or an opera-
tor policy.

In some embodiments, the apparatus further includes a
second sending device configured to:
receive, by the relay UE, a PQI sent by the remote UE,
and determine, based on the PQI, a PQI to be sent to the
remote UE according to a QoS support capability of the
relay UE, and the remote UE uses the received PQI to
communicate with the relay UE;
determine, by the relay UE, a 5QI according to the PQI
determined by the relay UE and a mapping relationship
between PQI and QoS parameter 5QI of the Uu inter-
face sent by a PCF, and the relay UE uses the 5QI to
communicate with the core network.

In some embodiments, the determining device is config-
ured to:
determine, by the relay UE, the PC5 PDB and the Uu PDB
according to a size of the resource configuration infor-
mation of the PC5 interface and the Uu interface;
and a communication delay of an interface with smaller
resource configuration is greater than a communication
delay of an interface with larger resource configuration;
and a sum of the PC5 PDB and the Uu PDB is a
communication delay in 5QI determined by the relay
UE.

In some embodiments, the determining device is config-
ured to:
determine, by the relay UE, the PC5 PDB according to a
PQI interface sent by the remote UE and a mapping
relationship between PQI and PC5 PDB sent by the
PCF;
determine, by the relay UE, the Uu PDB by subtracting
the PC5 PDB from a communication delay in 5QI;
and the 5QI is determined by the relay UE according to
the PQI sent by the remote UE and a mapping rela-
tionship between PQI and 5QI sent by the PCF.

In some embodiments, the determining device is config-
ured to:
determine, by the relay UE, the PC5 PDB by subtracting
the Uu PDB sent by the SMF from a communication
delay in 5QI sent by the SMF;
and the 5QI and the Uu PDB are determined by the PCF
according to a PC5 PDB sent by the remote UE and
service requirement information, and the PC5 PDB sent
by the remote UE is determined by the remote UE
according to the resource configuration information of
the PC5 interface.

In some embodiments of the disclosure further provide a
second apparatus for communication between a user termi-
nal and a network, including: a receiving device and a
communication device, and:
the receiving device is configured to receive a PC5 PDB
sent by a relay UE, and the PC5 PDB is determined by
the relay UE;
the communication device is configured to communicate
with the relay UE using the PC5 PDB.
As an optional embodiment:
the PC5 PDB is determined by the relay UE according to
resource configuration information of the PC5 inter-
face; or
the PC5 PDB is determined by the relay UE according to
policy information sent by a PCF; or
the PC5 PDB is determined by the relay UE according to
Uu PDB sent by an SMF.

In some embodiments, the apparatus further includes a
first receiving device configured to:
receive, by the remote UE, a PQI sent by the relay UE.
The communication device is configured to:
communicate, by the remote UE, with the relay UE
according to the PC5 PDB and the PQI if the PC5 PDB
is not carried in the PQI;
communicate, by the remote UE, with the relay UE
according to the PQI carrying the PC5 PDB if the PC5
PDB is carried in the PQI.

In some embodiments, the apparatus further includes a
sending device configured to:
determine, by the remote UE, the PC5 PDB according to
resource configuration information of the PC5 inter-
face, and send the determined PC5 PDB to an AF, and
the AF sends the received PC5 PDB to the PCF, and the
PCF determines 5QI and Uu PDB according to the received PC5 PDB and service requirement information and sends the 5QI and the Uu PDB to the relay UE through an SMF.

In some embodiment of the disclosure further provides a third apparatus for communication between a user terminal and a network, including: a determining device and a sending device, and:

the determining device is configured to determine a Uu PDB to be sent to a relay UE according to a received Uu PDB;

the sending device is configured to send the determined Uu PDB to be sent to the relay UE to the relay UE.

In some embodiments, the determining device is configured to:

determine the Uu PDB to be sent to the relay UE according to subscription information and/or an operator policy based on the received Uu PDB sent by the relay UE; or determine the Uu PDB to be sent to the relay UE based on the received Uu PDB sent by a PCF; and the Uu PDB sent by the PCF is determined by the PCF according to PC5 PDB sent by a remote UE and service requirement information.

In some embodiments, the apparatus further includes a first sending device configured to:

determine a 5QI to be sent to the relay UE according to subscription information and/or an operator policy based on a received 5QI of the Uu interface sent by the relay UE; and send the 5QI to be sent to the relay UE to the relay UE; or send a received 5QI sent by a PCF to the relay UE; and the 5QI sent by the PCF is determined by the PCF according to a service requirement.

In some embodiments of the disclosure further provide a processor readable storage medium storing a computer program, which is configured to cause the processor to perform the method described in the above-mentioned embodiments.

These and other embodiments of the present application will be to understand in the description of the following embodiments.

BRIEF DESCRIPTION OF THE DRAWINGS

In order to illustrate the embodiments of the disclosure more clearly, the accompanying figures which need to be used in describing the embodiments will be introduced below briefly. The accompanying figures described below are only some embodiments of the disclosure, and other accompanying figures can also be obtained according to these accompanying figures.

DETAILED DESCRIPTION OF THE EMBODIMENTS

Figure 1:
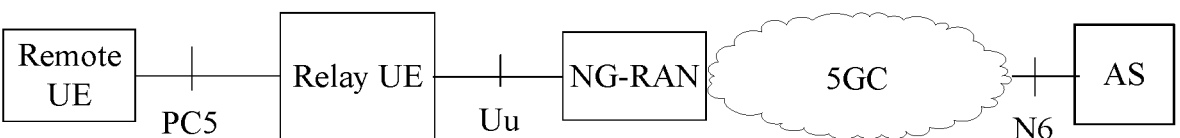
FIG. 1 is a schematic diagram of a 5G proximity service system according to an embodiment of the disclosure.

Embodiments of the disclosure will be further illustrated below in details with reference to the accompanying drawings. The described embodiments are only a part of the embodiments of the disclosure but not all the embodiments.

The embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Long Term Evolution Advanced (LTE-A) system, Universal Mobile Telecommunication System (UMTS), Worldwide interoperability for Microwave Access (WiMAX) system, 5G New Radio (NR) system, etc. These systems all include terminal devices and network devices. A core network part may also be included in the system, such as Evolved Packet System (EPS), 5G System (5GS), etc.

The terminal device involved in the embodiments of the present application may be a device for providing the voice and/or data connectivity to the user, a handheld device with the wireless connection function, or other processing device connected to the wireless modem, etc. In different systems, the terminal device may have different names. For example, in a 5G system, the terminal device may be referred to as User Equipment (UE). The wireless terminal device may communicate with one or more Core Networks (CNs) via the Radio Access Network (RAN). The wireless terminal device may be a mobile terminal, such as a mobile telephone (or called "cellular" telephone), and a computer with the mobile terminal, for example, may be a portable, pocket, handheld, computer built-in or vehicle-carried mobile device, and they exchange the voice and/or data with the radio access network. For example, Personal Communication Service (PCS) telephone, cordless telephone, Session Initiation Protocol (SIP) telephone, Wireless Local Loop (WLL) station, Personal Digital Assistant (PDA) and other devices. The wireless terminal device can also be called system, subscriber device, subscriber station, mobile station, mobile, remote station, access point, remote terminal, access terminal, user terminal, user agent, user device, which is not limited in the embodiments of the present application.

The network device involved in the embodiments of the present application may be a base station, which may include cells providing services for terminals. Depending on application scenarios, the base station may also be called access point, or may be a device in the access network communicating with the wireless terminal devices via one or more sectors over the air interface, or other names. The network device may be used to exchange the received air frame with the Internet Protocol (IP) packet, and used as the router between the wireless terminal device and the rest of the access network. The rest of the access network may include IP networks. The network device may further coordinate the attribute management of the air interface. For example, the network device involved in the embodiments of the present application can be a network device (Base Transceiver Station (BTS)) in the Global System for Mobile communication (GSM) or Code Division Multiple Access (CDMA), or can be a network device (NodeB) in the Wide-band Code Division Multiple Access (WCDMA), or can be an evolutional network device (evolutional Node B (eNB or e-NodeB)) in the Long Term Evolution (LTE) system, a 5G base station in the 5G network architecture (next generation system), or can be a Home evolved Node B (HeNB), a relay node, femto, pico, etc., which is not limited in the embodiments of the present application. In some network structures, the network device may include a Centralized Unit (CU) node and a Distributed Unit (DU) node, and the centralized unit and the distributed unit may also be geographically separated.

One or more antennas may be used between the network device and the terminal device for Multi Input Multi Output (MIMO) transmission, which may be Single User MIMO (SU-MIMO) or Multiple User MIMO (MU-MIMO). According to the form and number of antenna combinations, the MIMO transmission may be 2D-MIMO, 3D-MIMO, FD-MIMO or massive-MIMO, or may be diversity transmission or precoding transmission or beamforming transmission, etc.

The term "and/or" in the embodiments of the disclosure describes the association relationship of associated objects, indicating that there may be three relationships, for example, A and/or B may represent: only A, both A and B, and only B. The character "/" generally indicates that the associated objects have a kind of "or" relationship.

The term "a plurality of" in the embodiments of the present application refers to two or more, and other quantifiers are similar thereto.

The application scenarios described in the embodiments of the disclosure are intended to illustrate the embodiments of the disclosure more clearly, and do not constitute a limitation on the embodiments of the disclosure.

The embodiments of the present application will be described clearly and completely below in combination with the accompanying drawings in the embodiments of the present application. The described embodiments are only a part of the embodiments of the present application but not all the embodiments.

It should be noted that a method for communication between a user terminal and a network provided in the embodiments may be applied to a remote terminal, a relay terminal and a network device. The network device may be an SMF entity or a network device with the same function as the SMF entity. The network device in the embodiments of the disclosure is only an example. With the emergence of new network devices, the embodiments provided are also applicable.

Embodiment 1: this embodiment of the disclosure provides a method for communication between a user terminal and a network, which can be applied to the ProSe scenario in the 5G system. A specific implementation in which a Remote UE communicates with the network through a Relay UE to obtain the related services is as follows.

As shown in FIG. 1, the 5G ProSe system includes a remote UE, a relay UE, a Radio Access Network (NG-RAN), a Core Network (5GC), and an Access Stratum (AS). The remote UE communicates with the relay UE through a PC5 interface (the communication interface between UEs). The relay UE communicates with the radio access network through a Uu interface. The 5GC communicates with the AS through an N6 interface.

When a UE is outside the network coverage or the signal quality of the Uu interface is poor, the UE cannot directly connect to the network, and have to connect to the network through a UE with relay function. The former is called Remote UE, and the latter is called Relay UE. The Relay UE registers with the network, and establishes a PDU (Protocol Data Unit) session and a QoS flow to implement the communication with the network. The Remote UE communicates with the Relay UE through the PC5 interface, and forwards data through the PDU session and the QoS flow of the Relay UE, to achieve the purpose of communicating with the network.

It should be noted that the 5GC includes at least the following physical devices: AMF (Access and Mobility Management Function) entity, UPF (User Plane Function) entity, SMF (Session Management Function) entity, and PCF (Policy Control Function) entity.

Figure 2:
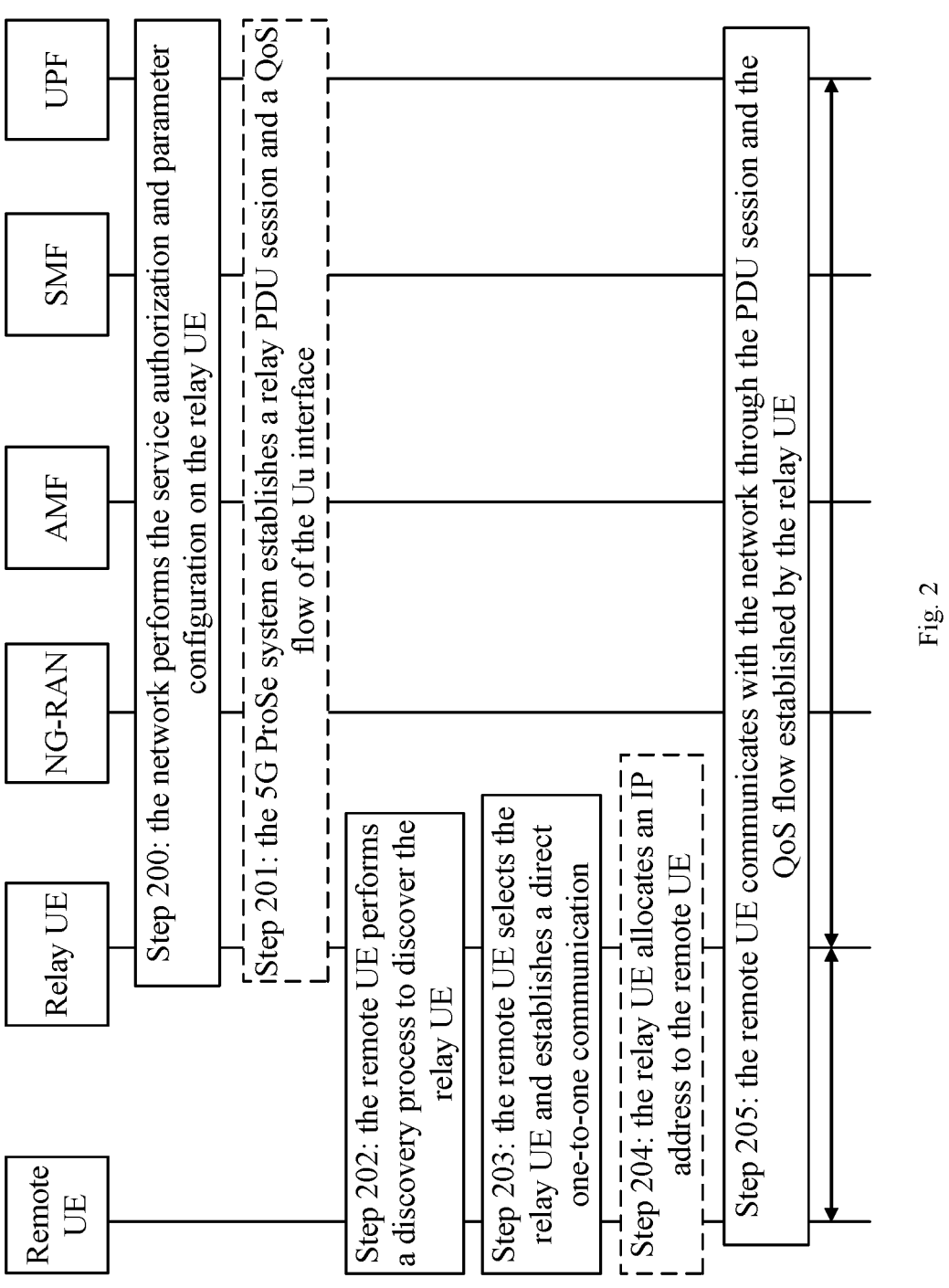
FIG. 2 is a flowchart of establishing a PDU session and a QoS flow in the 5G proximity service system according to an embodiment of the disclosure.

As shown in FIG. 2, at present, the establishment process of the PDU session and the QoS flow in the 5G ProSe system is as follows.

Step 200: the network performs the service authorization and parameter configuration on the remote UE and the relay UE.

For example, the network authorizes whether the UE can use the relay UE for communication and what parameters are required for the communication with the relay UE, such as the network configuration parameter "Relay Service Code" for indicating the connection service provided by the relay UE.

Step 201: the 5G ProSe system establishes a relay PDU session and a QoS flow of the Uu interface.

Step 202: the remote UE performs a discovery process to discover the relay UE.

Step 203: the remote UE selects the relay UE and establishes a direct one-to-one communication therewith.

Here, the communication interface between the remote UE and the relay UE is a PC5 interface. If a PDU session needs to be newly established, the relay initiates a new PDU session establishment process.

Step 204: the relay UE allocates an IP address to the remote UE.

Step 205: the remote UE communicates with the network through the PDU session and the QoS flow established by the relay UE.

Figure 3:
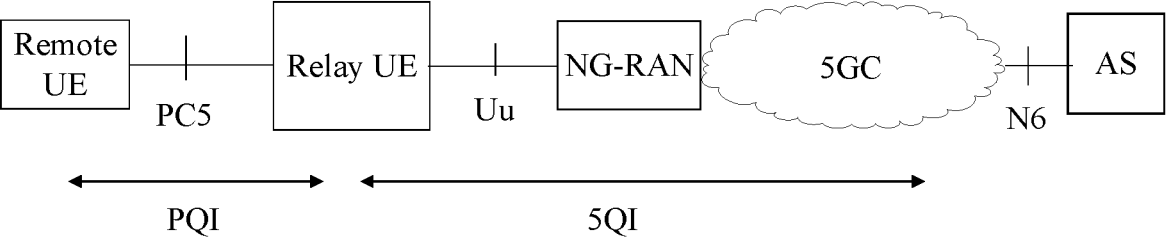
FIG. 3 is a schematic diagram of a QoS guarantee mechanism according to an embodiment of the disclosure.

As shown in FIG. 3, a schematic diagram of the end-to-end (Remote UE to UPF entity) QoS guarantee mechanism based on the PCF and/or SMF is provided. The communication between the Remote UE and the network includes two parts: PC5 interface communication and Uu interface communication. Thus, the end-to-end QoS between the Remote UE and the network (UPF) includes: the QoS of the PC5 interface and the QoS of the Uu interface.

Currently, the QoS guarantee mechanism from the Remote UE to the UPF is implemented in two following ways.

In the first way, the PCF (according to service requirements) or SMF (according to DNN (Data Network Name) or S-NSSAI (Single Network Slice Selection Assistance Information)) determines the QoS parameter 5QI (5G QoS identifier) of the Uu interface of the Relay UE, and the Relay UE determines the QoS parameter PQI (PC5 QoS identifier) of the PC5 interface according to the pre-configured mapping relationship.

In the second way, the PCF determines the QoS parameter of the Uu interface and the QoS parameter of the PC5 interface of the Relay UE based on service requirements. In particular, the end-to-end (Remote UE to UPF) delay is guaranteed by the delay of the PC5 interface and the delay of the Uu interface. For example, the end-to-end (Remote UE to UPF) delay is 100 ms, so the delay of the PC5 interface may be 50 ms, and the delay of the Uu interface may be 50 ms. The delay allocation here is only an example. The disclosure does not limit how to allocate the delays of the interfaces.

It should be noted that the 5QI is a vector, including priority, PDB (Packet Delay Budget), PER (Packet Error Rate) and other parameters. Similarly, the PQI is a vector, including priority, PDB, PER and other parameters. The delay of the PC5 interface is represented by the PDB in the PQI, and the delay of the Uu interface is represented by the PDB in the 5QI.

In some embodiments, the PCF or SMF determines the QoS parameter of the Uu interface and the QoS parameter of the PC5 interface of the Relay UE according to the service requirements, but cannot accurately determine the QoS parameter of the PC5 interface and the QoS parameter of the Uu interface, especially in the case when the interface resources are limited. How to reasonably guarantee the QoS flow of the Uu interface and the PC5 interface to enable the relay UE and the remote UE to communicate with the network, is a problem that needs to be solved urgently.

In order to solve the above problem, embodiments of the disclosure propose a method for the Relay UE to determine the QoS parameter of the PC5 interface and the QoS parameter of the Uu interface. Compared with the method in which the network determines the QoS parameters according to the service information in the prior art, this method can better meet the end-to-end QoS requirement of the Remote UE, to achieve the purpose of communicating with the network.

Figure 4A:
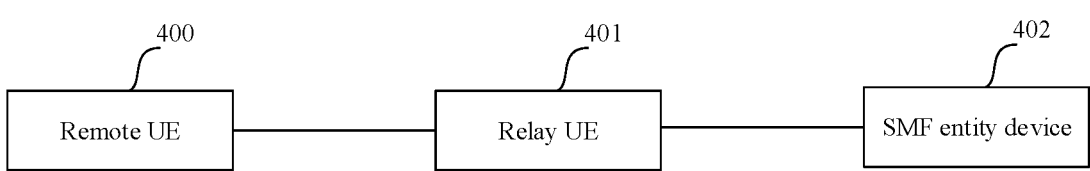
FIG. 4A is a schematic diagram of a system for communication between a user terminal and a network according to an embodiment of the disclosure.
Figure 4B:
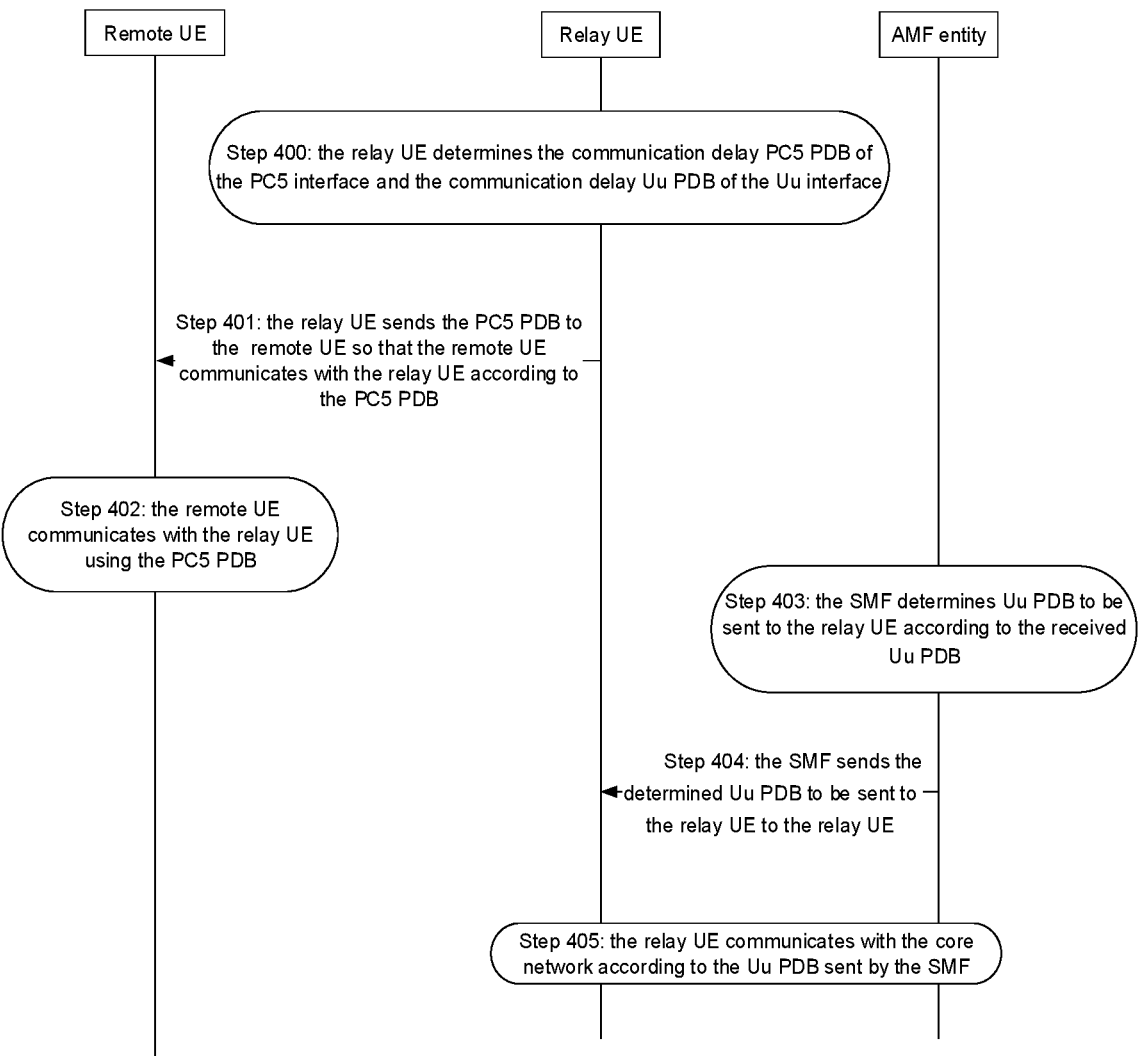
FIG. 4B is a flowchart of implementation of a method for communication between a user terminal and a network according to an embodiment of the disclosure.

As shown in FIG. 4A, a system for communication between a user terminal and a network provided in an embodiment includes a remote UE 400, a relay UE 401 and an SMF entity device 402. The PC5 interface is an interface between the remote UE and the relay UE, and the Uu interface is an interface between the relay UE and the core network. As shown in FIG. 4B, the implementation steps of the system are described below.

Step 400: the relay UE determines the packet delay budget (PDB) of the PC5 interface (PC5 PDB) and the PDB of the Uu interface (Uu PDB).

It should be noted that the PC5 PDB in the embodiment of the disclosure is the communication delay between the remote UE and the relay UE, and the Uu PDB is the communication delay between the relay UE and the UPF entity device.

In an implementation, the relay UE determines the PC5 PDB and the Uu PDB in three following ways.

In the first way, the relay UE determines the PC5 PDB and the Uu PDB according to the resource configuration information of the PC5 interface and the Uu interface.

In this way, the relay UE sends the Uu PDB to the SMF, and the SMF determines, based on the Uu PDB, a Uu PDB sent to the relay UE according to the subscription information and/or an operator policy.

In this way, the relay UE receives a QoS parameter PQI of the PC5 interface sent by the remote UE, and determines, based on the PQI, a PQI sent to the remote UE according to the QoS support capability of the relay UE, and the remote UE uses the PQI to communicate with the relay UE.

The relay UE determines the 5QI according to the PQI and a mapping relationship between PQI and QoS parameter 5QI of the Uu interface sent by the PCF, and the relay UE uses the 5QI to communicate with the core network.

It should be noted that the PQI and the PC5 PDB are the QoS parameter and the communication delay corresponding to the QoS flow between the relay UE and the remote UE; and the 5QI and the Uu PDB are the QoS parameter and the communication delay corresponding to the QoS flow between the relay UE and the UPF entity.

The mapping relationship between PQI and 5QI sent by the PCF may be preset, and this mapping relationship is stored in the PCF and sent by the PCF to the relay UE.

In this way, the relay UE determines the PC5 PDB and the Uu PDB according to the size of the resource configuration information of the PC5 interface and the Uu interface.

Here, a communication delay of an interface with smaller resource configuration is greater than a communication delay of an interface with larger resource configuration. The sum of the PC5 PDB and the Uu PDB is a communication delay in the 5QI determined by the relay UE. It is easy to understand that the relay UE receives the PQI sent by the remote UE and determines the 5QI according to the received mapping relationship between PQI and 5QI sent by the PCF; and the relay UE determines the PC5 PDB and the Uu PDB in the first way, and the sum of the finally determined PC5 PDB and Uu PDB is the communication delay in the 5QI determined by the relay UE.

An optional implementation in this way is: the relay UE sends the 5QI and the Uu PDB determined by the relay UE to the SMF through the AMF, and the SMF determines, based on the 5QI and the Uu PDB, the 5QI and Uu PDB sent to the relay UE according to the subscription information and/or the operator policy. It can also be understood that the SMF determines whether to modify the received 5QI and Uu PDB according to subscription information and/or the operator policy, and sends the modified or unmodified 5QI and Uu PDB to the relay UE.

Another optional implementation in this way is: the relay UE sends the 5QI and the Uu PDB determined by the relay UE to the SMF through the AMF, and sends them to the PCF through the SMF, and the PCF determines, based on the 5QI and the Uu PDB, the 5QI and Uu PDB sent to the relay UE according to the subscription information and/or the operator policy.

In the second way, the relay UE determines the PC5 PDB and the Uu PDB according to the policy information sent by the PCF.

The policy information in the embodiment may be operator policy information or self-defined policy information, which is not limited in this embodiment of the disclosure.

In this way, the relay UE sends the Uu PDB to the SMF, and the SMF determines, based on the Uu PDB, the Uu PDB sent to the relay UE according to the subscription information and/or an operator policy.

In this way, the relay UE receives a QoS parameter PQI of the PC5 interface sent by the remote UE, and determines, based on the PQI, the PQI sent to the remote UE according to the QoS support capability of the relay UE, and the remote UE uses the PQI to communicate with the relay UE.

The relay UE determines the 5QI according to the PQI and a mapping relationship between PQI and QoS parameter 5QI of the Uu interface sent by the PCF, and the relay UE uses the 5QI to communicate with the core network.

In this way, the relay UE determines the PC5 PDB according to the PQI sent by the remote UE and the mapping relationship between PQI and PC5 PDB sent by the PCF; and the relay UE determines the Uu PDB by subtracting the PC5 PDB from the communication delay in the 5QI.

Here, the 5QI is determined by the relay UE according to the PQI sent by the remote UE and a mapping relationship between PQI and 5QI sent by the PCF.

An optional implementation in this way is: the relay UE sends the 5QI and the Uu PDB determined by the relay UE to the SMF through the AMF, and the SMF determines, based on the 5QI and the Uu PDB, the 5QI and Uu PDB sent to the relay UE according to the subscription information and/or the operator policy. It can also be understood that the SMF determines whether to modify the received 5QI and Uu PDB according to subscription information and/or the operator policy, and sends the modified or unmodified 5QI and Uu PDB to the relay UE.

Another optional implementation in this way is: the relay UE sends the 5QI and the Uu PDB determined by the relay UE to the SMF through the AMF, and sends them to the PCF through the SMF, and the PCF determines, based on the 5QI and the Uu PDB, the 5QI and Uu PDB sent to the relay UE according to the subscription information and/or the operator policy.

In the third way, the relay UE receives the Uu PDB sent by the SMF, and determines the PC5 PDB according to the Uu PDB.

In this way, the Uu PDB sent by the SMF is determined by the SMF according to the Uu PDB sent by the PCF.

In this way, the relay UE receives the 5QI sent by the SMF, and determines the PC5 PDB by subtracting the Uu PDB sent by the SMF from the communication delay in the 5QI sent by the SMF.

Here, the 5QI and the Uu PDB are determined by the PCF according to the PC5 PDB sent by the remote UE and the service requirement information. For example, the PCF determines the 5QI according to the service requirement and a mapping relationship between service requirement and 5QI, and subtracts the received PC5 PDB from the communication delay in the 5QI to obtain the Uu PDB.

The PC5 PDB is determined by the remote UE according to the resource configuration information of the PC5 interface. In other words, the remote UE determines the PC5 PDB according to the resource configuration information of the PC5 interface and then sends it to the PCF through the application service function AF, and the PCF determines the 5QI and Uu PDB according to the service requirement and the PC5 PDB.

It should be noted that the relay UE will send the determined PC5 PDB to the remote UE in the three ways described above, and the remote UE uses the PC5 PDB to communicate with the relay UE. However, after determining the Uu PDB in the above first or second way, the relay UE will not directly use the Uu PDB to communicate with the core network, but send the determined Uu PDB to the SMF, and the SMF determines whether to change the Uu PDB determined by the relay UE according to the subscription information and/or the operator policy.

Optionally, the relay UE will send the determined PQI to the remote UE in the three ways described above, and the remote UE uses the PC5 PDB to communicate with the relay UE.

However, after determining the 5QI in the above first or second way, the relay UE will not directly use the 5QI to communicate with the core network, but send the determined 5QI to the SMF, and the SMF determines whether to change the 5QI determined by the relay UE according to the subscription information and/or the operator policy.

Step 401: the relay UE sends the PC5 PDB to the remote UE and the remote UE communicates with the relay UE according to the PC5 PDB.

It should be noted that the PC5 PDB in the embodiment of the disclosure is the communication delay of the communication between the relay UE and the remote UE through the PC5 interface, and is also understood as the upper limit of the packet transmission delay of the communication between the remote UE and the relay UE. That is, the remote UE sends the received high-level data packet (PDU) to the relay UE by means of packet within the packet transmission delay determined by the PC5 PDB, and the relay UE sends the received high-level data packet (PDU) to the remote UE by means of packet within the packet transmission delay determined by the PC5 PDB, to achieve the purpose of communicating between the remote UE and the relay UE. That is to say, the PC5 PDB in the embodiment of the disclosure is the communication delay directed at the high-level data packet.

Furthermore, if the remote UE does not send the received high-level data packet (PDU) to the relay UE within the packet transmission delay determined by the PC5 PDB, the data packet is discarded (deleted), and/or, if the relay UE does not send the received high-level data packet (PDU) to the remote UE within the packet transmission delay determined by the PC5 PDB, the data packet is discarded (deleted), to avoid affecting the transmission of subsequent data packets.

Further, after the PC5 PDB is sent to the remote UE, the remote UE may use the PC5 PDB to replace the QoS parameter PQI between the relay UE and the remote UE, and establish a QoS flow and a PDU session according to the PQI, to achieve the purpose of communicating between the remote UE and the relay UE.

Optionally, the relay UE sends the Uu PDB to the SMF, and the SMF, based on the Uu PDB, determines the Uu PDB sent to the relay UE according to the subscription information and/or operator policy.

Optionally, the relay UE determines the PQI sent to the remote UE according to the QoS support capability of the relay UE based on the PQI sent by the remote UE. The relay UE determines the 5QI according to the PQI and the mapping relationship between PQI and 5QI, and the relay UE uses the 5QI to communicate with the core network.

Step 402: the remote UE receives the PC5 PDB sent by the relay UE, where the PC5 PDB is determined by the relay UE; and the remote UE communicates with the relay UE using the PC5 PDB.

Optionally, the remote UE receives the PQI sent by the relay UE; and the remote UE communicates with the relay UE using the PQI.

The remote UE communicates with the relay UE according to the PC5 PDB and the PQI if the PC5 PDB is not carried in the PQI.

The remote UE communicates with the relay UE according to the PQI carrying the PC5 PDB if the PC5 PDB is carried in the PQI.

A possible implementation is the remote UE determines the PC5 PDB according to the resource configuration information of the PC5 interface and sends it to the application service function AF, and the AF sends the PC5 PDB to the PCF. The PCF determines the 5QI and Uu PDB according to the PC5 PDB and the service requirement information and sends them to the relay UE through the SMF, and the relay UE uses the 5QI and the Uu PDB to communicate with the network.

Step 403: the SMF determines the Uu PDB to be sent to the relay UE according to the received Uu PDB.

Optionally, the ways in which the SMF receives the Uu PDB include but are not limited to the following two ways.

In the first way, the SMF receives the Uu PDB sent by the relay UE. The SMF determines the Uu PDB to be sent to the relay UE according to the subscription information and/or operator policy based on the Uu PDB sent by the relay UE.

In this way, the method further includes: The SMF receives the QoS parameter 5QI of the Uu interface sent by the relay UE, and the SMF determines the 5QI to be sent to the relay UE according to the subscription information and/or operator policy based on the 5QI sent by the relay UE.

In the second way, the SMF receives the Uu PDB sent by the PCF; and the SMF determines the Uu PDB sent by the PCF as the Uu PDB to be sent to the relay UE.

Here, the Uu PDB sent by the PCF is determined by the PCF according to the PC5 PDB sent by the remote UE and the service requirement information.

In this way, the method further includes: The SMF receives the 5QI sent by the PCF; and the SMF sends the 5QI sent by the PCF to the relay UE.

Here, the 5QI sent by the PCF is determined by the PCF according to the service requirement.

Step 404: the SMF sends the determined Uu PDB to be sent to the relay UE to the relay UE.

Step 405: the relay UE communicates with the core network according to the Uu PDB sent by the SMF.

It can be understood that the relay UE receives the Uu PDB sent by the SMF and communicates with the core network through the Uu PDB.

It should be noted that the Uu PDB in the embodiment of the disclosure is the communication delay of the communication between the relay UE and the UPF through the Uu interface, and is also understood as the upper limit of the packet transmission delay of the communication between the relay UE and the UPF. That is, the relay UE sends the received high-level data packet (PDU) to the UPF by means of packet within the packet transmission delay determined by the Uu PDB, and the UPF sends the received high-level data packet (PDU) to the relay UE by means of packet within the packet transmission delay determined by the Uu PDB, to achieve the purpose of communicating between the relay UE and the core network.

That is to say, the Uu PDB in the embodiment of the disclosure is the communication delay directed at the high-level data packet.

Furthermore, if the relay UE does not send the received high-level data packet (PDU) to the UPF within the packet transmission delay determined by the Uu PDB, the data packet is discarded (deleted), and/or, if the UPF does not send the received high-level data packet (PDU) to the relay UE within the packet transmission delay determined by the Uu PDB, the data packet is discarded (deleted), to avoid affecting the transmission of subsequent data packets.

Further, after the SMF sends the Uu PDB to the relay UE, the relay UE may use the Uu PDB to replace the communication delay in the QoS parameter 5QI between the relay UE and the UPF, and establish a QoS flow and a PDU session according to the 5QI, to achieve the purpose of communicating with the core network.

To sum up, the embodiment of the disclosure is based on the packet delay budget of the PC5 interface (PC5 PDB) and the packet delay budget of the Uu interface (Uu PDB) determined by the relay UE, and the communication delays determined by the relay UE are more accurate, compared with the communication delay of the PC5 interface and the communication delay of the Uu interface determined by the PCF or SMF in the prior art.

Figure 5:
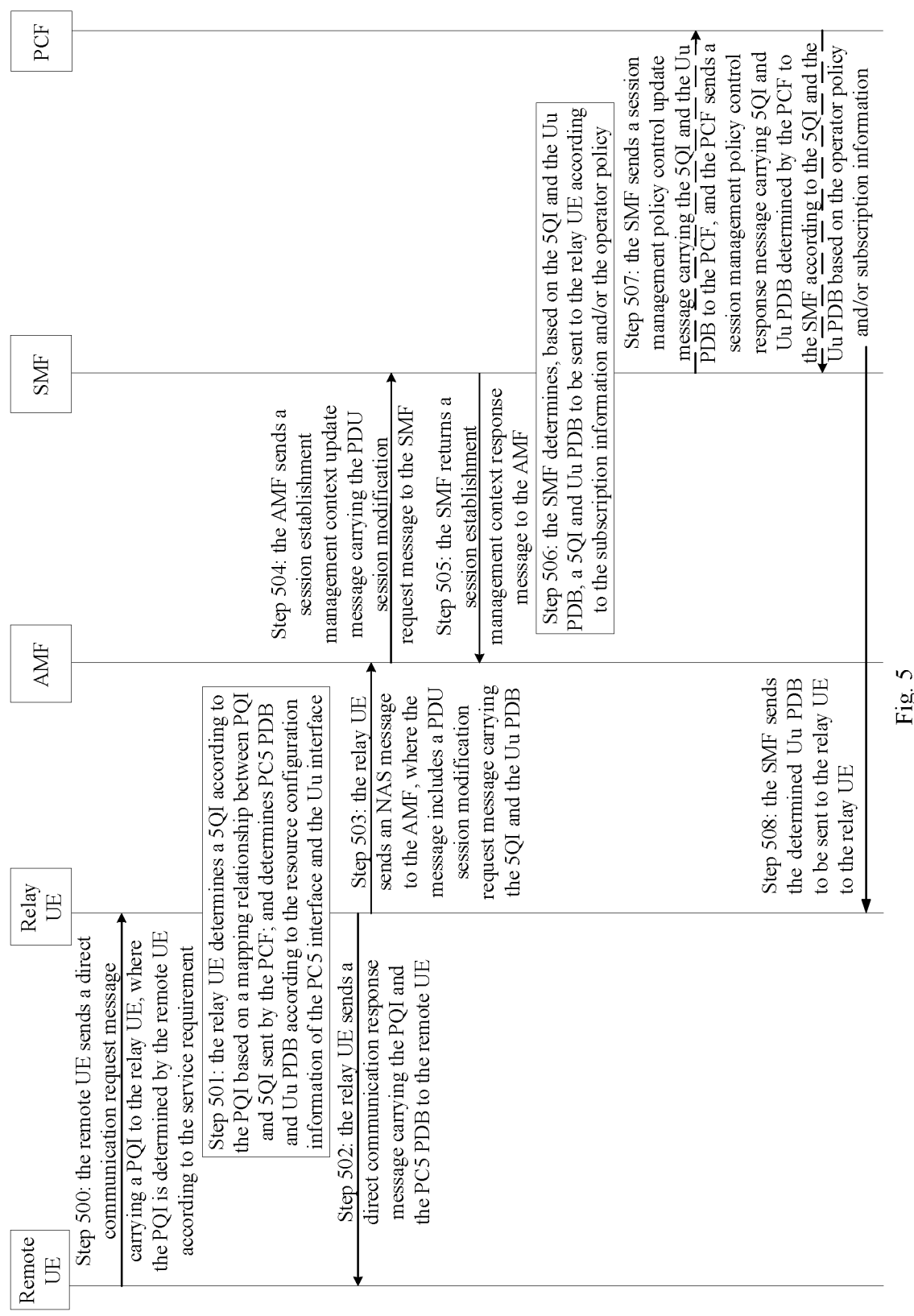
FIG. 5 is a flowchart of a method for a relay UE to initiate the creation or modification of a quality of service flow according to an embodiment of the disclosure.

As shown in FIG. 5, the embodiment provides a method for a relay UE to initiate the creation or modification of a quality of service flow, and the remote terminal and the relay terminal communicate with the network. The implementation steps are as follows.

Step 500: the remote UE sends a direct communication request message carrying a PQI to the relay UE, where the PQI is determined by the remote UE according to the service requirement.

Step 501: the relay UE determines the 5QI according to the PQI based on a mapping relationship between PQI and 5QI sent by the PCF; and the relay UE determines the PC5 PDB and the Uu PDB according to the resource configuration information of the PC5 interface and the Uu interface.

Here, the PC5 PDB is the communication delay of the PC5 interface, and the Uu PDB is the communication delay of the Uu interface.

The relay UE determines the PC5 PDB and the Uu PDB according to the size of the resource configuration information of the PC5 interface and the Uu interface.

Here, a communication delay of an interface with smaller resource configuration is greater than a communication delay of an interface with larger resource configuration; and the sum of the PC5 PDB and the Uu PDB is a communication delay in the 5QI determined by the relay UE. For example, when the resources of the PC5 interface are limited (for example, less resources are configured for the PC5 communication), the short-delay transmission requirement cannot be met. Then the PC5 PDB is set to a larger value and the Uu PDB is set to a smaller value, and the sum of the PC5 PDB and the Uu PDB is the communication delay PDB in the 5QI determined by the relay UE.

Furthermore, the step 501 and step 502 are not in any particular order, and may also be performed simultaneously, which is not limited in the embodiments of the disclosure.

Step 502: the relay UE sends a direct communication response message carrying the PQI and the PC5 PDB to the remote UE.

In an implementation, the remote UE uses the PC5 PDB to communicate with the relay UE in two following ways.

In the first way, if the PQI does not carry the PC5 PDB, that is, the PQI is a specific value, then the parameter in the PQI is also a specific value, for example, PQI=1, then the communication delay PC5 PDB in the PQI is 100 ms.

In this way, the remote UE communicates with the relay UE according to the PC5 PDB and the PQI.

In the second way, if the PQI carries the PC5 PDB, that is, non-standardized PQI, the PQI itself cannot represent a specific value, and the communication delay PC5 PDB in the PQI is determined by the explicit value of each parameter in the PQI.

In this way, the remote UE communicates with the relay UE according to the PQI carrying the PC5 PDB.

Step 503: the relay UE sends an NAS (Non-Access Stratum) message to the AMF, where the message includes a Protocol Data Unit (PDU) session modification request message carrying the 5QI and the Uu PDB and is used to indicate to the SMF that the remote UE is to create or modify the QoS flow.

Step 504: the AMF sends a session establishment management context update message carrying the PDU session modification request message to the SMF, where the update message carries the 5QI and the Uu PDB.

Step 505: the SMF returns a session establishment management context response message to the AMF.

Step 506: the SMF determines, based on the 5QI and the Uu PDB, the 5QI and the Uu PDB to be sent to the relay UE according to the subscription information and/or the operator policy.

Optionally, Step 507: the SMF sends a session management policy control update message carrying the 5QI and the Uu PDB to the PCF.

And, the PCF sends a session management policy control response message carrying the 5QI and Uu PDB determined by the PCF to the SMF, The 5QI and Uu PDB is determined by the PCF according to the 5QI and the Uu PDB based on the operator policy and/or subscription information.

The above steps 506 and 507 are in a parallel relationship. In an implementation, the SMF may determine the 5QI and Uu PDB to be sent to the relay UE in the way of the step 506 or step 507.

Step 508: the SMF sends the determined Uu PDB to be sent to the relay UE to the relay UE.

For example, the SMF may send the Uu PDB to the relay UE by the following steps.

Step 1) The SMF sends an N1N2 transfer message to the AMF, where the N1N2 transfer message includes an N1 SM message to be sent to the relay UE and an N2 SM message to be sent to the NG-RAN. The N1 SM message includes the 5QI and Uu PDB, and the N2 SM message includes the 5QI and Uu PDB.

Step 2) The AMF sends the N2 message to the NG-RAN. This message includes the N1 SM message carrying the 5QI and Uu PDB and the N2 SM message carrying the 5QI and Uu PDB.

Step 3) The NG-RAN sends an RRC message to the relay UE. This message includes the N1 SM message carrying the 5QI and Uu PDB.

Figure 6:
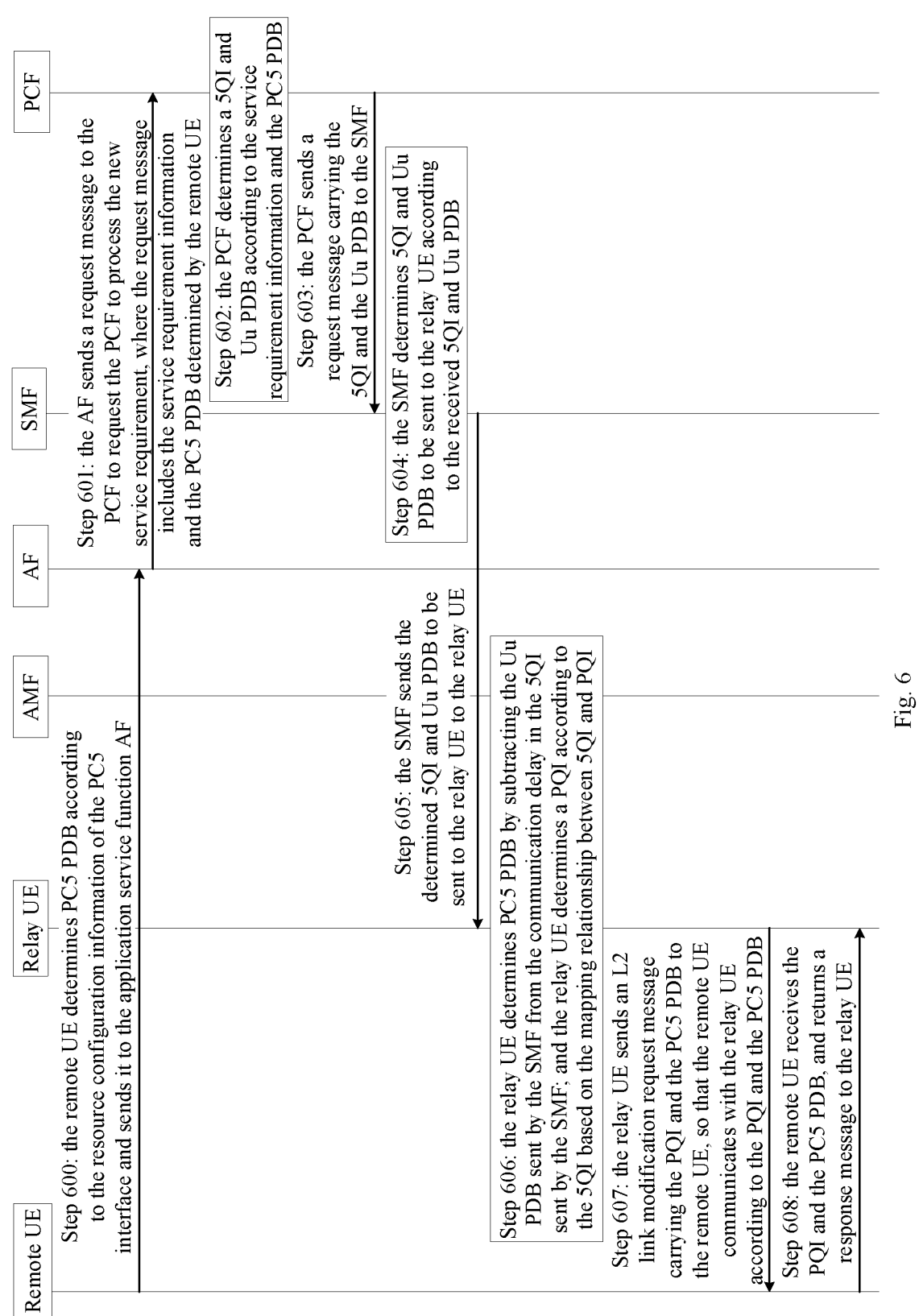
FIG. 6 is a flowchart of a method for a remote UE to initiate the creation or modification of a quality of service flow according to an embodiment of the disclosure.

As shown in FIG. 6, the embodiment provides a method for a remote UE to initiate the creation or modification of a quality of service flow, and the remote terminal and the relay terminal can communicate with the network. The implementation steps are as follows.

Step 600: the remote UE determines the PC5 PDB according to the resource configuration information of the PC5 interface and sends the PC5 PDB to the application service function AF.

The remote UE interacts with the application service function AF through application layer signaling. When the remote UE has a new service request, the remote UE provides the PC5 PDB to the AF.

Step 601: the AF sends a request message to the PCF to request the PCF to process the new service request. The request message includes the service requirement information and the PC5 PDB determined by the remote UE.

Step 602: the PCF determines the 5QI and the Uu PDB according to the service requirement information and the PC5 PDB.

In an implementation, the PCF determines the 5QI according to the received service requirement based on a mapping relationship between service requirement and 5QI; and the PCF subtracts the received PC5 PDB from the communication delay PDB in the 5QI to obtain the Uu PDB.

Here, the PDB in the 5QI reflects the delay requirement between the remote UE and the UPF, and this delay requirement includes two parts: one part is the Uu PDB, that is, the communication delay between the relay UE and the UPF, and the other part is the PC5 PDB, that is, the communication delay between the remote UE and the relay UE.

Step 603: the PCF sends a request message carrying the 5QI and the Uu PDB to the SMF.

Step 604: the SMF determines the 5QI and Uu PDB to be sent to the relay UE according to the received 5QI and Uu PDB.

Step 605: the SMF sends the determined 5QI and Uu PDB to be sent to the relay UE to the relay UE.

In an implementation, the 5QI and Uu PDB may be sent by the following steps.

Step 1) The SMF sends an N1N2 transfer message to the AMF, where the N1N2 transfer message includes an N1 SM message sent to the relay UE and an N2 SM message sent to the NG-RAN. The N1 SM message includes the 5QI and Uu PDB, and the N2 SM message includes the 5QI and Uu PDB.

Step 2) The AMF sends an N2 message to the NG-RAN, where this message includes the N1 SM message carrying the 5QI and Uu PDB and the N2 SM message carrying the 5QI and Uu PDB.

Step 3) The NG-RAN sends an RRC message to the relay UE, where this message includes the N1 SM message carrying the 5QI and Uu PDB.

Step 606: the relay UE determines the PC5 PDB by subtracting the Uu PDB sent by the SMF from the communication delay in the 5QI sent by the SMF; and the relay UE determines the PQI according to the 5QI based on the mapping relationship between 5QI and PQI.

Step 607: the relay UE sends an L2 link modification request message carrying the PQI and the PC5 PDB to the remote UE, and the remote UE communicates with the relay UE according to the PQI and the PC5 PDB.

Step 608: the remote UE receives the PQI and the PC5 PDB, and returns a response message to the relay UE.

Embodiment 2: based on the same inventive concept, embodiments of the disclosure further provide a relay terminal. Since this terminal is a terminal corresponding to the method on the relay UE side in the embodiments of the disclosure and the principle of this terminal to solve the problem is similar to that of the method, the implementations of this terminal can refer to the implementations of the method, and the repeated description thereof will be omitted here.

Figure 7:
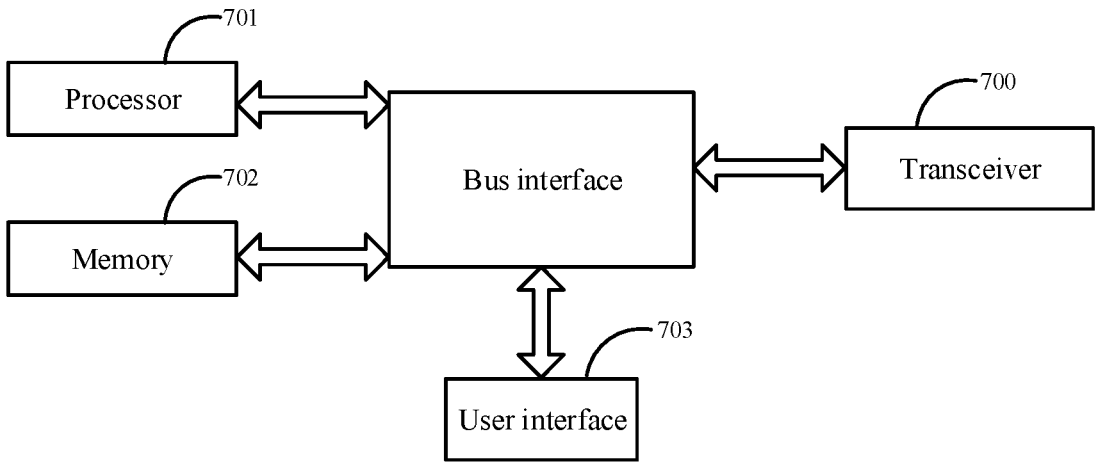
FIG. 7 is a schematic diagram of a relay terminal according to an embodiment of the disclosure.

As shown in FIG. 7, an embodiment of the disclosure provides a relay terminal, including a transceiver 700, a processor 701 and a memory 702. The memory 702 is configured to store a computer program; the transceiver is configured to send and receive data under control of the processor; and the processor is configured to read the computer program in the memory and perform the following operations:

determining, by a relay UE, a packet delay budget (PDB) of a PC5 interface (PC5 PDB) and a PDB of a Uu interface (Uu PDB);

sending, by the relay UE, the PC5 PDB to a remote UE and the remote UE communicates with the relay UE according to the PC5 PDB; and communicating, by the relay UE, with a core network according to Uu PDB sent by an SMF.

Here, in FIG. 7, the bus architecture can include any numbers of interconnected buses and bridges, and link various circuits of one or more processors represented by the processor 701 and the memory represented by the memory 702. The bus architecture may further link various other circuits such as peripheral device, voltage regulator and power management circuit, which are all well known in the art and thus will not be further described again herein.

The bus interface provides an interface. The transceiver 700 may be some elements, i.e., include a transmitter and a receiver, and provide the units for communicating with various other devices over the transmission media, including wireless channel, wired channel, optical cable, etc. For different user equipments, the user interface 703 may also be the interface capable of inter-connecting or intra-connecting with the required devices, and the connected devices include but not limited to keypad, display, loudspeaker, microphone, joystick and the like.

The processor 701 is responsible for managing the bus architecture and general processing, and the memory 702 may store the data used by the processor 701 when performing the operations.

Optionally, the processor 701 may be Central Processing Unit (CPU), Application Specific Integrated Circuit (ASIC), Field-Programmable Gate Array (FPGA) or Complex Programmable Logic Device (CPLD), and the processor may also use a multi-core architecture.

The processor is configured to execute any one of the methods provided in the embodiments of the present application according to the obtained executable instructions by invoking the computer program stored in the memory. The processor and memory may also be physically separated.

As an optional embodiment, the processor is configured to perform:

determining, by the relay UE, the PC5 PDB and the Uu PDB according to resource configuration information of the PC5 interface and the Uu interface; or determining, by the relay UE, the PC5 PDB and the Uu PDB according to policy information sent by a PCF; or receiving, by the relay UE, the Uu PDB sent by the SMF, and determining the PC5 PDB according to the Uu PDB.

As an optional embodiment, the processor is further configured to perform:

if the relay UE determines the PC5 PDB and the Uu PDB according to the resource configuration information of the PC5 interface and the Uu interface, or if the relay UE determines the PC5 PDB and the Uu PDB according to the policy information sent by the PCF:

sending, by the relay UE, the Uu PDB to the SMF, and the SMF determines, based on the Uu PDB, the Uu PDB to be sent to the relay UE according to subscription information and/or an operator policy.

As an optional embodiment, the processor is further configured to perform:

receiving, by the relay UE, a QoS parameter PQI of the PC5 interface sent by the remote UE, and determining, based on the PQI, a PQI to be sent to the remote UE according to a QoS support capability of the relay UE, and the remote UE uses the PQI to communicate with the relay UE;

determining, by the relay UE, 5QI according to the PQI and a mapping relationship between PQI and QoS parameter 5QI of the Uu interface sent by a PCF, and the relay UE uses the 5QI to communicate with the core network.

As an optional embodiment, the processor is configured to perform:

determining, by the relay UE, the PC5 PDB and the Uu PDB according to a size of the resource configuration information of the PC5 interface and the Uu interface; and a communication delay of an interface with smaller resource configuration is greater than a communication delay of an interface with larger resource configuration; and a sum of the PC5 PDB and the Uu PDB is a communication delay in 5QI determined by the relay UE.

As an optional embodiment, the processor is configured to perform:

determining, by the relay UE, the PC5 PDB according to a QoS parameter PQI of the PC5 interface sent by the remote UE and a mapping relationship between PQI and PC5 PDB sent by the PCF;

determining, by the relay UE, the Uu PDB by subtracting the PC5 PDB from a communication delay in 5QI;

and the 5QI is determined by the relay UE according to the PQI sent by the remote UE and a mapping relationship between PQI and 5QI sent by the PCF.

As an optional embodiment, the processor is configured to perform:

determining, by the relay UE, the PC5 PDB by subtracting the Uu PDB sent by the SMF from a communication delay in 5QI sent by the SMF;

and the 5QI and the Uu PDB are determined by the PCF according to a PC5 PDB sent by the remote UE and service requirement information, and the PC5 PDB is determined by the remote UE according to the resource configuration information of the PC5 interface.

It should be noted here that the above-mentioned terminal provided in the embodiments of the disclosure can implement all the method steps implemented in the above-mentioned method embodiments and can achieve the same effects. The parts and beneficial effects in the embodiments same as those in the method embodiments will not be described here in detail.

Embodiment 3: based on the same inventive concept, embodiments of the disclosure further provide a remote terminal. Since this terminal is a terminal corresponding to the method on the remote UE side in the embodiments of the disclosure and the principle of this terminal to solve the problem is similar to that of the method, the implementations of this terminal can refer to the implementations of the method, and the repeated description thereof will be omitted here.

Figure 8:
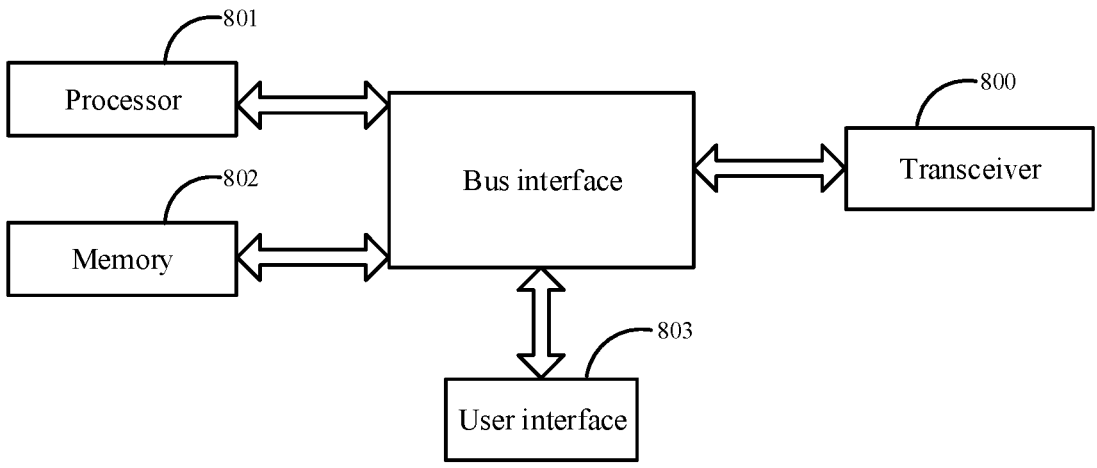
FIG. 8 is a schematic diagram of a remote terminal according to an embodiment of the disclosure.

As shown in FIG. 8, an embodiment of the disclosure provides a remote terminal, including a transceiver 800, a processor 801 and a memory 802. The memory 802 is configured to store a computer program; the transceiver is configured to send and receive data under control of the processor; and the processor is configured to read the computer program in the memory and perform the following operations:

receiving, by a remote UE, a PC5 PDB sent by a relay UE, and the PC5 PDB is determined by the relay UE;

communicating, by the remote UE, with the relay UE using the PC5 PDB.

Here, in FIG. 8, the bus architecture may include any numbers of interconnected buses and bridges, and link various circuits of one or more processors represented by the processor 801 and the memory represented by the memory 802. The bus architecture may further link various other circuits such as peripheral device, voltage regulator and power management circuit, which are all well known in the art and thus will not be further described again herein. The bus interface provides an interface. The transceiver 800 may be elements, i.e., include a transmitter and a receiver, and provide the units for communicating with various other devices over the transmission media, including wireless channel, wired channel, optical cable, etc. For different user equipments, the user interface 803 may also be the interface capable of inter-connecting or inter-connecting with the required devices, and the connected devices include but not limited to keypad, display, loudspeaker, microphone, joystick and the like.

The processor 801 is responsible for managing the bus architecture and general processing, and the memory 802 may store the data used by the processor 801 when performing the operations.

Optionally, the processor 801 may be Central Processing Unit (CPU), Application Specific Integrated Circuit (ASIC), Field-Programmable Gate Array (FPGA) or Complex Programmable Logic Device (CPLD), and the processor may also use a multi-core architecture.

The processor is configured to execute any one of the methods provided in the embodiments of the present application according to the obtained executable instructions by invoking the computer program stored in the memory. The processor and memory may also be physically separated.

As an optional embodiment, the PC5 PDB is determined by the relay UE, including:

the PC5 PDB is determined by the relay UE according to resource configuration information of the PC5 interface; or the PC5 PDB is determined by the relay UE according to policy information sent by a PCF; or the PC5 PDB is determined by the relay UE according to Uu PDB sent by the SMF.

As an optional embodiment, the processor is further configured to perform:

receiving, by the remote UE, PQI sent by the relay UE;

communicating, by the remote UE, with the relay UE according to the PC5 PDB and the PQI if the PC5 PDB is not carried in the PQI;

communicating, by the remote UE, with the relay UE according to the PQI carrying the PC5 PDB if the PC5 PDB is carried in the PQI.

As an optional embodiment, the processor is further configured to perform:

determining, by the remote UE, the PC5 PDB according to resource configuration information of the PC5 interface, and send the PC5 PDB to an AF, and the AF sends the PC5 PDB to the PCF, and the PCF determines 5QI and Uu PDB according to the PC5 PDB and service requirement information and sends the 5QI and the Uu PDB to the relay UE through an SMF.

It should be noted here that the above-mentioned terminal provided in the embodiments of the disclosure can implement all the method steps implemented in the above-mentioned method embodiments and can achieve the same effects. The parts and beneficial effects in the embodiments same as those in the method embodiments will not be described here in detail.

Embodiment 4: based on the same inventive concept, embodiments of the disclosure further provide a network device. Since this device is a device corresponding to the method on the SMF side in the embodiments of the disclosure and the principle of this device to solve the problem is similar to that of the method, the implementations of this device can refer to the implementations of the method, and the repeated description thereof will be omitted here.

Figure 9:
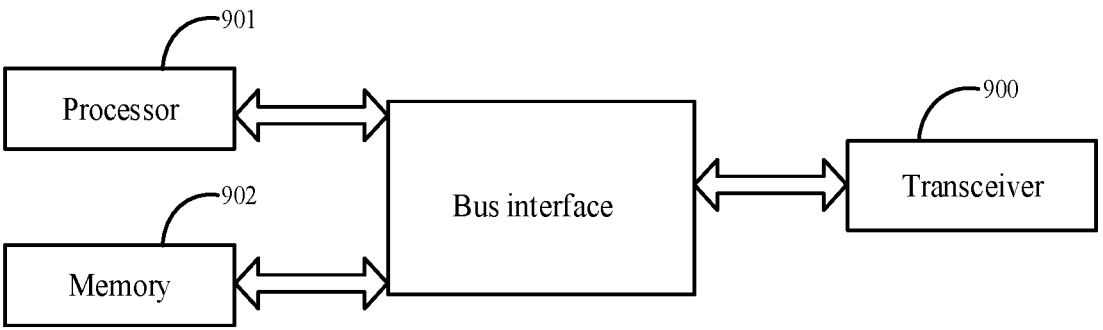
FIG. 9 is a schematic diagram of a network device according to an embodiment of the disclosure.

As shown in FIG. 9, embodiments of the disclosure further provide a network device, including a transceiver 900, a processor 901 and a memory 902. The memory 902 is configured to store a computer program; the transceiver is configured to send and receive data under control of the processor; and the processor is configured to read the computer program in the memory and perform the following operations:

determining, by an SMF, a Uu PDB to be sent to a relay UE according to a received Uu PDB;

sending, by the SMF, the determined Uu PDB to be sent to the relay UE to the relay UE.

Here, in FIG. 9, the bus architecture may include any numbers of interconnected buses and bridges, and link various circuits of one or more processors represented by the processor 901 and the memory represented by the memory 902. The bus architecture may further link various other circuits such as peripheral device, voltage regulator and power management circuit, which are all well known in the art and thus will not be further described again herein. The bus interface provides an interface. The transceiver 900 may be elements, i.e., include a transmitter and a receiver, and provide the units for communicating with various other devices over the transmission media, including wireless channel, wired channel, optical cable, etc. The processor 901 is responsible for managing the bus architecture and general processing, and the memory 902 may store the data used by the processor 901 when performing the operations.

The processor 901 may be Central Processing Unit (CPU), Application Specific Integrated Circuit (ASIC), Field-Programmable Gate Array (FPGA) or Complex Programmable Logic Device (CPLD), and the processor may also use a multi-core architecture.

As an optional embodiment, the processor is configured to perform:

determining, by the SMF, the Uu PDB to be sent to the relay UE according to subscription information and/or an operator policy based on the received Uu PDB sent by the relay UE; or determining, by the SMF, the Uu PDB to be sent to the relay UE based on the received Uu PDB sent by a PCF; and the Uu PDB sent by the PCF is determined by the PCF according to PC5 PDB sent by a remote UE and service requirement information.

As an optional embodiment, the processor is further configured to perform:

determining, by the SMF, 5QI to be sent to the relay UE according to subscription information and/or an operator policy based on a received QoS parameter 5QI of the Uu interface sent by the relay UE; and sending, by the SMF, the 5QI to be sent to the relay UE to the relay UE; or sending, by the SMF, received 5QI sent by a PCF to the relay UE; and the 5QI sent by the PCF is determined by the PCF according to a service requirement.

It should be noted here that the above-mentioned device provided in the embodiments of the disclosure can implement all the method steps implemented in the above-mentioned method embodiments and can achieve the same effects. The parts and beneficial effects in the embodiments same as those in the method embodiments will not be described here in detail.

Embodiment 5: based on the same inventive concept, embodiments of the disclosure further provide a first apparatus for communication between a user terminal and a network. Since this apparatus is an apparatus corresponding to the method on the relay UE side in the embodiments of the disclosure and the principle of this apparatus to solve the problem is similar to that of the method, the implementations of this apparatus can refer to the implementations of the method, and the repeated description thereof will be omitted here.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a processor readable storage medium. Based on such understanding, the embodiments of the present application essentially or a part that contributes to the prior art or all or a part of the embodiments may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes USB flash drive, mobile hard disk, Read-Only Memory (ROM), Random Access Memory (RAM), magnetic disk or compact disc or various media that can store the program codes.

Figure 10:
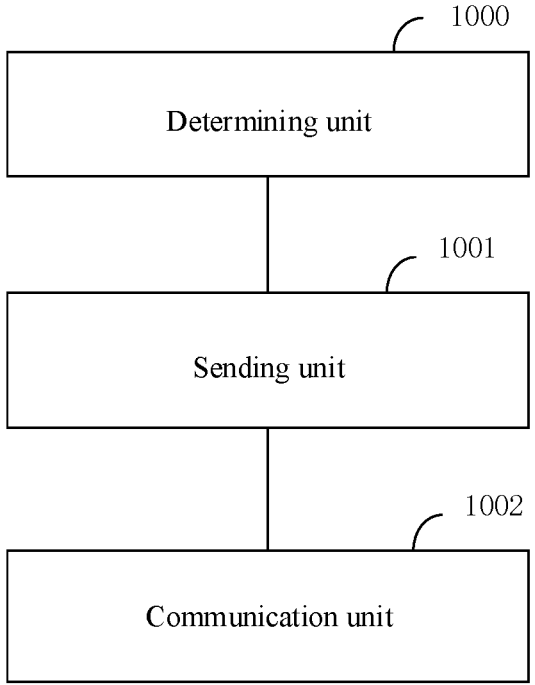
FIG. 10 is a first apparatus for communication between a user terminal and a network according to an embodiment of the disclosure.

As shown in FIG. 10, the apparatus includes: a determining device 1000, a sending device 1001 and a communication device 1002.

The determining device is configured to determine a PC5 PDB and a Uu PDB.

The sending device is configured to send the PC5 PDB to a remote UE and the remote UE communicates with the relay UE according to the PC5 PDB.

The communication device is configured to communicate with a core network according to Uu PDB sent by an SMF.

As an optional embodiment, the determining device is configured to:
   determine, by the relay UE, the PC5 PDB and the Uu PDB according to resource configuration information of the PC5 interface and the Uu interface; or
   determine, by the relay UE, the PC5 PDB and the Uu PDB according to policy information sent by a PCF; or
   receive, by the relay UE, the Uu PDB sent by the SMF, and determine the PC5 PDB according to the Uu PDB.

As an optional embodiment, the apparatus further includes a first sending device configured to:
   if the relay UE determines the PC5 PDB and the Uu PDB according to the resource configuration information of the PC5 interface and the Uu interface, or
   if the relay UE determines the PC5 PDB and the Uu PDB according to the policy information sent by the PCF:
   send, by the relay UE, the Uu PDB to the SMF, and the SMF determines, based on the Uu PDB, the Uu PDB to be sent to the relay UE according to subscription information and/or an operator policy.

As an optional embodiment, the apparatus further includes a second sending device configured to:
   receive, by the relay UE, a QoS parameter PQI of the PC5 interface sent by the remote UE, and determine, based on the PQI a PQI to be sent to the remote UE according to a QoS support capability of the relay UE, and the remote UE uses the PQI to communicate with the relay UE;
   determine, by the relay UE, 5QI according to the PQI and a mapping relationship between PQI and QoS parameter 5QI of the Uu interface sent by a PCF, and the relay UE uses the 5QI to communicate with the core network.

As an optional embodiment, the determining device is configured to:
   determine, by the relay UE, the PC5 PDB and the Uu PDB according to a size of the resource configuration information of the PC5 interface and the Uu interface;
   and a communication delay of an interface with smaller resource configuration is greater than a communication delay of an interface with larger resource configuration; and a sum of the PC5 PDB and the Uu PDB is a communication delay in 5QI determined by the relay UE.

As an optional embodiment, the determining device is configured to:
   determine, by the relay UE, the PC5 PDB according to a QoS parameter PQI of the PC5 interface sent by the remote UE and a mapping relationship between PQI and PC5 PDB sent by the PCF;
   determine, by the relay UE, the Uu PDB by subtracting the PC5 PDB from a communication delay in 5QI;
   and the 5QI is determined by the relay UE according to the PQI sent by the remote UE and a mapping relationship between PQI and 5QI sent by the PCF.

As an optional embodiment, the determining device is configured to:
   determine, by the relay UE, the PC5 PDB by subtracting the Uu PDB sent by the SMF from a communication delay in 5QI sent by the SMF;
   and the 5QI and the Uu PDB are determined by the PCF according to a PC5 PDB sent by the remote UE and service requirement information, and the PC5 PDB is determined by the remote UE according to the resource configuration information of the PC5 interface.

It should be noted here that the above-mentioned apparatus provided in the embodiments of the disclosure can implement all the method steps implemented in the above-mentioned method embodiments and can achieve the same effects. The parts and beneficial effects in the embodiments same as those in the method embodiments will not be described here in detail.

Embodiment 6: based on the same inventive concept, embodiments of the disclosure further provide a second apparatus for communication between a user terminal and a network.

Since this apparatus is an apparatus corresponding to the method on the remote UE side in the embodiments of the disclosure and the principle of this apparatus to solve the problem is similar to that of the method, the implementations of this apparatus can refer to the implementations of the method, and the repeated description thereof will be omitted here.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a processor readable storage medium.

Based on such understanding, the embodiments of the present application essentially or a part that contributes to the prior art or all or a part of the embodiments may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes USB flash drive, mobile hard disk, Read-Only Memory (ROM), Random Access Memory (RAM), magnetic disk or compact disc or various media that can store the program codes.

Figure 11:
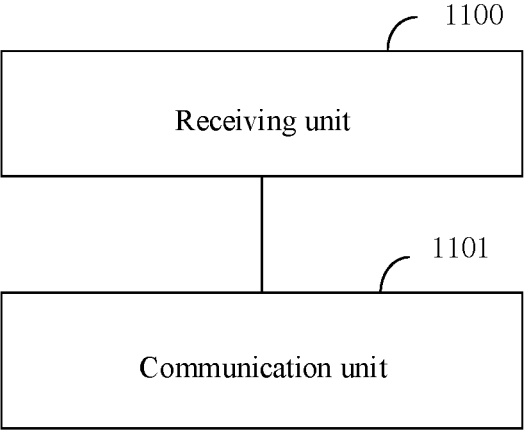
FIG. 11 is a second apparatus for communication between a user terminal and a network according to an embodiment of the disclosure.

As shown in FIG. 11, the apparatus includes: a receiving device 1100 and a communication device 1101.

The receiving device is configured to receive a PC5 PDB sent by a relay UE. The PC5 PDB is determined by the relay UE.

The communication device is configured to communicate with the relay UE using the PC5 PDB.

As an optional embodiment, the PC5 PDB is determined by the relay UE, including:

the PC5 PDB is determined by the relay UE according to resource configuration information of the PC5 interface; or the PC5 PDB is determined by the relay UE according to policy information sent by a PCF; or the PC5 PDB is determined by the relay UE according to Uu PDB sent by the SME As an optional embodiment, the apparatus further includes a first receiving device configured to:

receive, by the remote UE, a PQI sent by the relay UE;

communicate, by the remote UE, with the relay UE according to the PC5 PDB and the PQI if the PC5 PDB is not carried in the PQI;

communicate, by the remote UE, with the relay UE according to the PQI carrying the PC5 PDB if the PC5 PDB is carried in the PQI.

As an optional embodiment, the apparatus further includes a sending device configured to:

determine, by the remote UE, the PC5 PDB according to resource configuration information of the PC5 interface, and send the PC5 PDB to an AF, and the AF sends the PC5 PDB to the PCF, and the PCF determines 5QI and Uu PDB according to the PC5 PDB and service requirement information and sends the 5QI and the Uu PDB to the relay UE through an SMF.

It should be noted here that the above-mentioned apparatus provided in the embodiments of the disclosure can implement all the method steps implemented in the above-mentioned method embodiments and can achieve the same effects. The parts and beneficial effects in the embodiments same as those in the method embodiments will not be described here in detail.

Embodiment 7: based on the same inventive concept, embodiments of the disclosure further provide a third apparatus for communication between a user terminal and a network.

Since this apparatus is an apparatus corresponding to the method on the network device side in the embodiments of the disclosure and the principle of this apparatus to solve the problem is similar to that of the method, the implementations of this apparatus can refer to the implementations of the method, and the repeated description thereof will be omitted here.

It should be noted that the division of units in the embodiments of the present application is illustrative, and is merely a kind of logical function division, and there may be other division methods in actual implementations. In addition, the functional units in each embodiment of the present application may be integrated into one processing unit, or each unit may exist alone physically, or two or more units may be integrated into one unit. The above-mentioned integrated units can be implemented in the form of hardware, or can be implemented in the form of software functional units.

When the integrated unit is implemented in the form of software functional unit and sold or used as an independent product, it may be stored in a processor readable storage medium. Based on such understanding, the embodiments of the present application essentially or a part that contributes to the prior art or all or a part of the embodiments may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes USB flash drive, mobile hard disk, Read-Only Memory (ROM), Random Access Memory (RAM), magnetic disk or compact disc or various media that can store the program codes.

Figure 12:
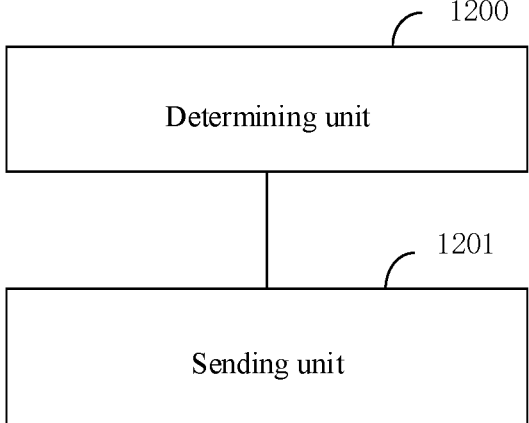
FIG. 12 is a third apparatus for communication between a user terminal and a network according to an embodiment of the disclosure.

As shown in FIG. 12, the apparatus includes: a determining device 1200 and a sending device 1201.

The determining device is configured to determine a Uu PDB to be sent to a relay UE according to a received Uu PDB.

The sending device is configured to send the determined Uu PDB to be sent to the relay UE to the relay UE.

As an optional embodiment, the determining device is configured to:

determine the Uu PDB to be sent to the relay UE according to subscription information and/or an operator policy based on the received Uu PDB sent by the relay UE; or determine the Uu PDB to be sent to the relay UE based on the received Uu PDB sent by a PCF; and the Uu PDB sent by the PCF is determined by the PCF according to PC5 PDB sent by a remote UE and service requirement information.

As an optional embodiment, the apparatus further includes a first sending device configured to:

determine a 5QI to be sent to the relay UE according to subscription information and/or an operator policy based on a received QoS parameter 5QI of the Uu interface sent by the relay UE; and send the 5QI to be sent to the relay UE to the relay UE; or send a received 5QI sent by a PCF to the relay UE; and the 5QI sent by the PCF is determined by the PCF according to a service requirement.

It should be noted here that the above-mentioned apparatus provided in the embodiments of the disclosure can implement all the method steps implemented in the above-mentioned method embodiments and can achieve the same effects. The parts and beneficial effects in the embodiments same as those in the method embodiments will not be described here in detail.

Figure 13:
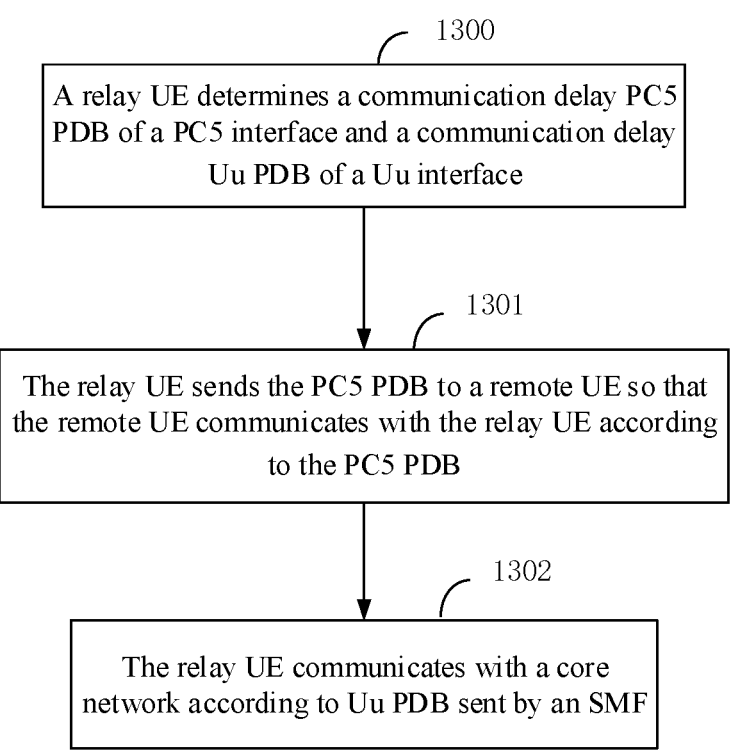
FIG. 13 is a flowchart of a first method for communication between a user terminal and a network according to an embodiment of the disclosure.

Embodiment 8: based on the same inventive concept, embodiments of the disclosure further provide a first method for communication between a user terminal and a network. As shown in FIG. 13, the implementation process of this method is as follows.

Step 1300: a relay UE determines a PC5 PDB and a Uu PDB.

Step 1301: the relay UE sends the PC5 PDB to a remote UE and the remote UE communicates with the relay UE according to the PC5 PDB.

Step 1302: the relay UE communicates with a core network according to the Uu PDB sent by an SMF.

In the method provided by the embodiments of the disclosure, the communication delay of the PC5 interface and the communication delay of the Uu interface are determined by the relay UE, rather than determined by the network device according to the service requirements, so the network can provide the relay UE with the more accurate quality of service to an extent, and the relay UE can also provide the remote user with the more accurate quality of service.

As an optional embodiment, the step in which the relay UE determines the PC5 PDB and the Uu PDB, includes:

the relay UE determining the PC5 PDB and the Uu PDB according to resource configuration information of the PC5 interface and the Uu interface; or the relay UE determining the PC5 PDB and the Uu PDB according to policy information sent by a PCF; or the relay UE receiving the Uu PDB sent by the SMF and determines the PC5 PDB according to the Uu PDB.

In the method provided in the embodiments, the relay UE can determine the communication delay of the PC5 interface and the communication delay of the Uu interface through different means, and each means can determine the communication delays of the two interfaces more accurately than the prior art. If the communication delays are determined according to the resource configuration information, the communication delays of the PC5 interface and the Uu interface can be accurately allocated according to the sizes of the resources configured for the PC5 interface and the Uu interface. If the communication delays are determined according to the policy information, the policy information in the embodiments, compared with the service requirement, considers factors including but not limited to service requirement, interface configuration resource, subscription information and operator policy, so the communication delays of the interfaces can still be accurately determined. If the communication delay of the PC5 interface is determined according to the Uu PDB sent by the SMF, the Uu PDB sent by the SMF is accurate, so the PC5 PDB determined based on the Uu PDB is also accurate.

As an optional embodiment, the method further includes:

if the relay UE determines the PC5 PDB and the Uu PDB according to the resource configuration information of the PC5 interface and the Uu interface, or if the relay UE determines the PC5 PDB and the Uu PDB according to the policy information sent by the PCF:

the relay UE sending the Uu PDB to the SMF, and the SMF determines, based on the Uu PDB, the Uu PDB to be sent to the relay UE according to subscription information and/or an operator policy.

Although the relay UE in the embodiments determines the Uu PDB, the relay UE may not directly use the Uu PDB to communicate with the core network but send the Uu PDB to the SMF, and the SMF determines whether to change the Uu PDB, and the Uu PDB determined by the relay UE in the embodiments can be changed according to the subscription information and/or the operator policy, the Uu PDB received finally by the relay UE is more in line with the current actual requirements, and the relay UE uses the received Uu PDB to communicate with the network.

As an optional embodiment, the method further includes:

the relay UE receiving a QoS parameter PQI of the PC5 interface sent by the remote UE, and determining, based on the PQI, a PQI to be sent to the remote UE according to a QoS support capability of the relay UE, and the remote UE uses the PQI to communicate with the relay UE;

the relay UE determining a 5QI according to the PQI and a mapping relationship between PQI and QoS parameter 5QI of the Uu interface sent by a PCF, and the relay UE uses the 5QI to communicate with the core network.

The relay UE in the embodiments of the disclosure may further send the PQI to the remote UE and determine the 5QI, and the remote UE uses the PQI and the PC5 PDB to communicate with the relay UE, and the relay UE uses the 5QI and the Uu PDB to communicate with the network.

As an optional embodiment, the step in which the relay UE determines the PC5 PDB and the Uu PDB according to the resource configuration information of the PC5 interface and the Uu interface, includes:

the relay UE determining the PC5 PDB and the Uu PDB according to a size of the resource configuration information of the PC5 interface and the Uu interface;

and a communication delay of an interface with smaller resource configuration is greater than a communication delay of an interface with larger resource configuration; and a sum of the PC5 PDB and the Uu PDB is a communication delay in 5QI determined by the relay UE.

In the embodiments, the communication delay of the interface can be determined according to the size of the resource configuration information of the interface, and the communication delay of the interface with the smaller resource configuration is greater than the communication delay of the interface with the larger resource configuration. The communication delay determined in this configuration manner is more accurate, and the end-to-end quality of service requirement of the remote UE can be met better.

As an optional embodiment, the step in which the relay UE determines the PC5 PDB and the Uu PDB according to the policy information sent by the PCF, includes:

the relay UE determining the PC5 PDB according to a PQI sent by the remote UE and a mapping relationship between PQI and PC5 PDB sent by the PCF;

the relay UE determining the Uu PDB by subtracting the PC5 PDB from a communication delay in 5QI;

and the 5QI is determined by the relay UE according to the PQI sent by the remote UE and a mapping relationship between PQI and 5QI sent by the PCF.

In the embodiments, the relay UE determines the PC5 PDB and the 5QI according to the policy information of the PCF (including the mapping relationship between PQI and PC5 PDB), and further determines the Uu PDB. Since the mapping relationship between PQI and PC5 PDB is predetermined, the communication delay is determined according to the relationship between the quality of service parameter and the communication delay, which better meets the quality of service requirement of the remote UE to an extent, and further better meets the quality of service requirement of the relay UE.

As an optional embodiment, the step in which the relay UE receives the Uu PDB sent by the SMF and determines the PC5 PDB according to the Uu PDB, includes:

the relay UE determining the PC5 PDB by subtracting the Uu PDB sent by the SMF from a communication delay in 5QI sent by the SMF;

and the 5QI and the Uu PDB are determined by the PCF according to a PC5 PDB sent by the remote UE and service requirement information, and the PC5 PDB is determined by the remote UE according to the resource configuration information of the PC5 interface.

Then, since the Uu PDB sent by the SMF is determined based on the PC5 PDB provided by the remote UE while the PC5 PDB provided by the remote UE is determined based on the resource configuration information of the PC5 interface, the communication delay from the remote UE to the relay UE can be accurately determined, and it is further explained that the communication delay from the relay UE to the core network can be accurately determined, and the end-to-end requirement of the remote UE can be better met ultimately.

Figure 14:
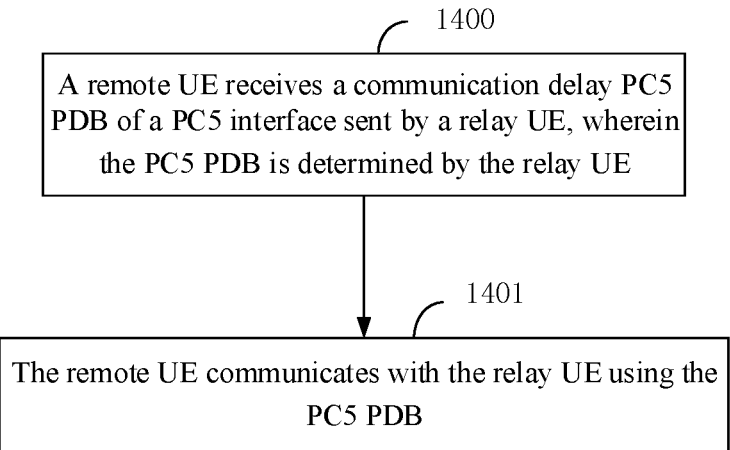
FIG. 14 is a flowchart of a second method for communication between a user terminal and a network according to an embodiment of the disclosure.

Embodiment 9: based on the same inventive concept, embodiments of the disclosure further provide a second method for communication between a user terminal and a network. As shown in FIG. 14, the implementation process of this method is as follows.

Step 1400: a remote UE receives a PC5 PDB sent by a relay UE. The PC5 PDB is determined by the relay UE.

Step 1401: the remote UE communicates with the relay UE using the PC5 PDB.

As an optional embodiment, the PC5 PDB is determined by the relay UE, including:

the PC5 PDB is determined by the relay UE according to resource configuration information of the PC5 interface; or the PC5 PDB is determined by the relay UE according to policy information sent by a PCF; or the PC5 PDB is determined by the relay UE according to Uu PDB sent by the SMF.

As an optional embodiment, the step in which the remote UE communicates with the relay UE using the PC5 PDB, further includes:

the remote UE receiving a PQI sent by the relay UE;

the remote UE communicating with the relay UE according to the PC5 PDB and the PQI if the PC5 PDB is not carried in the PQI;

the remote UE communicating with the relay UE according to the PQI carrying the PC5 PDB if the PC5 PDB is carried in the PQI.

As an optional embodiment, the method further includes:

the remote UE determining the PC5 PDB according to resource configuration information of the PC5 interface, and sends the PC5 PDB to an AF. The AF sends the PC5 PDB to the PCF, and the PCF determines 5QI and Uu PDB according to the PC5 PDB and service requirement information and sends the 5QI and the Uu PDB to the relay UE through an SMF.

Figure 15:
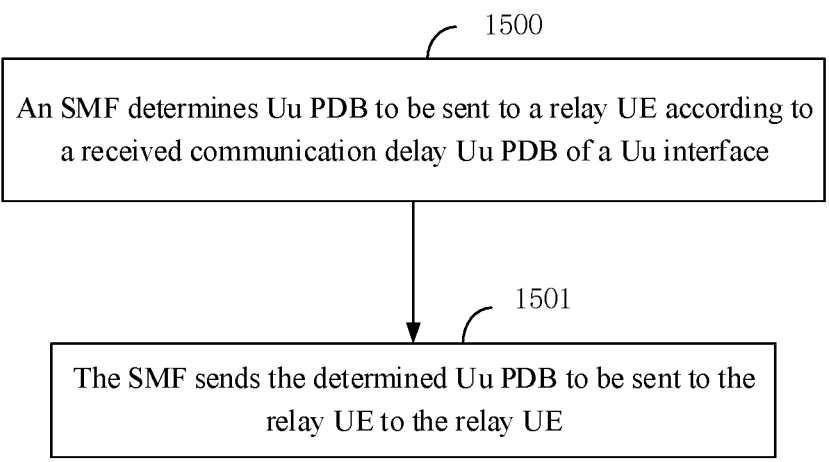
FIG. 15 is a flowchart of a third method for communication between a user terminal and a network according to an embodiment of the disclosure.

Embodiment 10: based on the same inventive concept, embodiments of the disclosure further provide a third method for communication between a user terminal and a network. As shown in FIG. 15, the implementation process of this method is as follows.

Step 1500: an SMF determines the Uu PDB to be sent to a relay UE according to a received Uu PDB.

Step 1501: the SMF sends the determined Uu PDB to be sent to the relay UE to the relay UE.

As an optional embodiment, the step in which the SMF determines the Uu PDB to be sent to the relay UE according to the received Uu PDB, includes:

the SMF determining the Uu PDB to be sent to the relay UE according to subscription information and/or an operator policy based on the received Uu PDB sent by the relay UE; or the SMF determining the Uu PDB to be sent to the relay UE based on the received Uu PDB sent by a PCF. The Uu PDB sent by the PCF is determined by the PCF according to PC5 PDB sent by a remote UE and service requirement information.

As an optional embodiment, the step in which the SMF sends the determined Uu PDB to be sent to the relay UE to the relay UE, further includes:

the SMF determining a 5QI to be sent to the relay UE according to subscription information and/or an operator policy based on a received QoS parameter 5QI of the Uu interface sent by the relay UE; and the SMF sending the 5QI to be sent to the relay UE to the relay UE; or the SMF sending a received 5QI sent by a PCF to the relay UE. The 5QI sent by the PCF is determined by the PCF according to a service requirement.

Embodiments further provide a processor storage medium, which may be any available media or data storage device accessible to the processor, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, non-transitory memory (NAND FLASH), Solid State Disk (SSD)) or the like.

Embodiments further provide a computer storage medium, where the program, when executed by a processor, implements the steps of the following method:

a relay UE determining a PC5 PDB and a Uu PDB;

the relay UE sending the PC5 PDB to a remote UE and the remote UE communicates with the relay UE according to the PC5 PDB;

the relay UE communicating with a core network according to Uu PDB sent by an SMF.

Embodiments further provide a processor storage medium, which may be any available media or data storage device accessible to the processor, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, non-transitory memory (NAND FLASH), Solid State Disk (SSD)) or the like.

Embodiments further provide a computer storage medium, where the program, when executed by a processor, implements the steps of the following method:

a remote UE receiving a PC5 PDB sent by a relay UE, here the PC5 PDB is determined by the relay UE;

the remote UE communicating with the relay UE using the PC5 PDB.

Embodiments further provide a processor storage medium, which may be any available media or data storage device accessible to the processor, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, non-transitory memory (NAND FLASH), Solid State Disk (SSD)) or the like.

Embodiments further provide a computer storage medium, where the program, when executed by a processor, implements the steps of the following method:

an SMF receiving a Uu PDB;

the SMF determining the Uu PDB to be sent to the relay UE according to the received Uu PDB.

The present application has been described above by reference to the block diagrams and/or flow charts showing the methods, devices (systems) and/or computer program products according to the embodiments of the present application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, and the instructions executed by the computer processor and/or another programmable data processing unit create the methods for implementing the functions and/or actions specified in the blocks of the block diagrams and/or flow charts.

Accordingly, the present application can also be implemented by the hardware and/or software (including the firmware, resident software, microcode and the like). Further, the present application can adopt the form of computer program products on the computer usable or computer readable storage medium, which has the computer usable or computer readable program codes implemented in the medium, to be used by the instruction execution system or used in combination with the instruction execution system. In the context of the present application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A method for communication between a user terminal and a network, comprising:

determining, by a relay User Equipment (UE), a packet delay budget (PDB) of a PC5 interface (PC5 PDB) and a PDB of a Uu interface (Uu PDB);

sending, by the relay UE, the PC5 PDB to a remote UE;

communicating, by the relay UE, with a core network using the Uu PDB;

wherein the determining, by the relay UE, of the PC5 PDB and the Uu PDB comprises:

determining, by the relay UE, the PC5 PDB and the Uu PDB according to resource configuration information of the PC5 interface and the Uu interface; or determining, by the relay UE, the PC5 PDB and the Uu PDB according to policy information sent by a Policy Control Function (PCF); or receiving, by the relay UE, a Uu PDB sent by a Session Management Function (SMF), and determining the PC5 PDB according to the Uu PDB sent by the SMF.

2. The method according to claim 1, further comprising:

when the relay UE determines the PC5 PDB and the Uu PDB according to the resource configuration information of the PC5 interface and the Uu interface, or when the relay UE determines the PC5 PDB and the Uu PDB according to the policy information sent by the PCF:

sending, by the relay UE, the determined Uu PDB to the SMF.

3. The method according to claim 1, further comprising:

receiving, by the relay UE, a Quality of Service (QoS) identifier of the PC5 interface (PQI) sent by the remote UE, and determining, based on the PQI, a PQI to be sent to the remote UE according to a QoS support capability of the relay UE;

determining, by the relay UE, a 5G QoS identifier (5QI) according to the PQI determined by the relay UE and a mapping relationship between a PQI and a 5QI of the Uu interface sent by the PCF; and communicating, by the relay UE, with the core network using the 5QI determined by the relay UE.

4. The method according to claim 1, wherein said determining, by the relay UE, the PC5 PDB and the Uu PDB according to the resource configuration information of the PC5 interface and the Uu interface, comprises:

determining, by the relay UE, the PC5 PDB and the Uu PDB according to a size of the resource configuration information of the PC5 interface and the Uu interface;

wherein a packet delay budget of an interface with a smaller size of resource configuration information is greater than a packet delay budget of an interface with a larger size of resource configuration information; and a sum of the PC5 PDB and the Uu PDB is a packet delay budget of a 5QI, and the 5QI is determined by the relay UE according to a PQI determined by the relay UE and a mapping relationship between a PQI and a 5QI of the Uu interface sent by the PCF.

5. The method according to claim 1, wherein said determining, by the relay UE, the PC5 PDB and the Uu PDB according to the policy information sent by the PCF, comprises:

determining, by the relay UE, the PC5 PDB according to a QoS identifier of the PC5 interface (PQI) sent by the remote UE and a mapping relationship between a PQI and a PC5 PDB sent by the PCF;

determining, by the relay UE, the Uu PDB by subtracting the PC5 PDB from a packet delay budget of a 5QI;

wherein the 5QI is determined by the relay UE according to the PQI sent by the remote UE and a mapping relationship between a PQI and a 5QI sent by the PCF.

6. The method according to claim 1, wherein said receiving, by the relay UE, the Uu PDB sent by the SMF, and said determining the PC5 PDB according to the Uu PDB, comprises:

determining, by the relay UE, the PC5 PDB by subtracting the Uu PDB sent by the SMF from a packet delay budget of a 5QI sent by the SMF.

7. A relay terminal, comprising a memory, a transceiver and a processor, wherein:

the memory is configured to store a computer program;

the transceiver is configured to send and receive data under control of the processor; and the processor is configured to read the computer program in the memory and perform the method of claim 1.

8. The relay terminal according to claim 7, wherein the processor is further configured to:

when determining the PC5 PDB and the Uu PDB according to the resource configuration information of the PC5 interface and the Uu interface, or when determining the PC5 PDB and the Uu PDB according to the policy information sent by the PCF:

send the determined Uu PDB to the SMF.

9. The relay terminal according to claim 7, wherein the processor is further configured to:

receive a Quality of Service (QoS) identifier of the PC5 interface (PQI) sent by the remote UE, and determine, based on the PQI, a PQI to be sent to the remote UE according to a QoS support capability of the relay terminal;

determine a 5G QoS identifier (5QI) according to the PQI determined by the relay terminal and a mapping relationship between a PQI and a 5QI of the Uu interface sent by the PCF; and communicate with the core network using the 5QI determined by the relay terminal.

10. A method for communication between a user terminal and a network, comprising:

determining, by a Session Management Function (SMF), a packet delay budget (PDB) of a Uu interface (Uu PDB) to be sent to a relay UE according to a received Uu PDB sent by the relay UE;

sending, by the SMF, the determined Uu PDB to be sent to the relay UE to the relay UE;

wherein said determining, by the SMF, the Uu PDB to be sent to the relay UE according to the received Uu PDB, comprises:

determining, by the SMF, the Uu PDB to be sent to the relay UE according to subscription information and/or an operator policy based on the received Uu PDB sent by the relay UE; or receiving, by the SMF, a Uu PDB sent by a Policy Control Function (PCF), and determining, by the SMF, the Uu PDB to be sent to the relay UE based on the Uu PDB sent by the PCF.

11. The method according to claim 10, wherein said sending, by the SMF, the determined Uu PDB to be sent to the relay UE to the relay UE, comprises:

determining, by the SMF, a 5G Quality of Service (QoS) identifier (5QI) to be sent to the relay UE according to subscription information and/or an operator policy based on a received 5QI of the Uu interface sent by the relay UE; and sending, by the SMF, the 5QI to be sent to the relay UE to the relay UE; or sending, by the SMF, a received 5QI sent by a PCF to the relay UE.

12. A network device, comprising a memory, a transceiver and a processor, wherein:

the memory is configured to store a computer program; the transceiver is configured to send and receive data under control of the processor; and the processor is configured to read the computer program in the memory and perform the method according to claim 10.

*　*　*　*　*